US006792170B2

(12) United States Patent
Kiadeh

(10) Patent No.: US 6,792,170 B2
(45) Date of Patent: Sep. 14, 2004

(54) METHOD FOR MAXIMIZING LIGHT THROUGHPUT IN AN OPTICAL SWITCH

(75) Inventor: Mansur B. Kiadeh, Cupertino, CA (US)

(73) Assignee: Lightbay Networks Corporation, Fremont, CA (US)

( * ) Notice: Subject to any disclaimer, the term of this patent is extended or adjusted under 35 U.S.C. 154(b) by 0 days.

(21) Appl. No.: 10/621,822

(22) Filed: Jul. 16, 2003

(65) Prior Publication Data

US 2004/0013350 A1 Jan. 22, 2004

Related U.S. Application Data

(63) Continuation-in-part of application No. 10/171,298, filed on Jun. 13, 2002.
(60) Provisional application No. 60/298,488, filed on Jun. 14, 2001.

(51) Int. Cl.⁷ .................................................. G02B 6/12

(52) U.S. Cl. ......................................... 385/14; 385/147

(58) Field of Search ...................... 385/14–16, 18–19, 385/24, 25, 30–33, 57, 147; 359/628, 629, 290

(56) References Cited

U.S. PATENT DOCUMENTS

| 6,320,993 | B1 | * | 11/2001 | Laor ............................ 385/16 |
| 6,571,029 | B1 | * | 5/2003 | Kruglick et al. .............. 385/16 |
| 2002/0093720 | A1 | * | 7/2002 | Hichwa et al. ............. 359/290 |
| 2002/0181069 | A1 | * | 12/2002 | Brown et al. ................ 359/290 |

* cited by examiner

Primary Examiner—Akm Enayet Ullah
(74) Attorney, Agent, or Firm—Burgess & Bereznak, LLP

(57) ABSTRACT

A method for maximizing light transmission through an optical switch which includes a first mirror to direct a beam of light received from an input optical port to a second mirror that redirects the beam of light to an output optical port, the first and second mirrors each being pivotally actuated in first and second directions. The input and output mirrors are simultaneously moved through a sequence of coordinate positions about an origin, the input and output mirrors moving in both the first and second directions, with a light intensity value being read at each coordinate position to find a maximum light intensity value. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

21 Claims, 31 Drawing Sheets

METHOD FOR MAXIMIZING LIGHT THROUGHPUT IN AN OPTICAL SWITCH

RELATED APPLICATIONS

This application is a continuation-in-part application of Ser. No. 10/171,298 filed Jun. 13, 2002 entitled, "PHOTONIC SWITCHING APPARATUS FOR OPTICAL COMMUNICATION NETWORK" which claims benefit of U.S. Ser. No. 60/298,488 filed on Jun. 14, 2001.

FIELD OF THE INVENTION

The present invention relates generally to apparatus and methods for movement of objects; specifically, objects such as mirrors that direct light beams in optical systems and networks.

BACKGROUND OF THE INVENTION

Fiberoptic technologies and systems have been widely deployed in recent decades. However, certain key components remain expensive and inefficient, which hinders the expansion of optical systems and optical communication networks. One of these components is the wavelength switch, which routes and redirects a light beam from one fiber to another fiber so that the signal can be provisioned and managed according to the demand. A typical wavelength switch used today converts the input light signal into an electronic signal to detect the routing information, switches the electronic signal, and then eventually reconverts it back into a light signal for further transmission. This device, commonly referred to as an Optical-Electrical-Optical (OEO) switch, not only depends on current semiconductor technologies and processes, but also requires a transmitter and a receiver for each transmission port. These factors cause OEQ switches to be large in size (e.g., occupying two or more 7-foot tall racks), to have high power consumption (e.g., kilowatts), to be network protocol and transmission rate dependent, to lack scalability, and to be costly.

Thus, there is a need for an alternative apparatus for directing a light beam in an optical system that can be manufactured efficiently and provide improved performance in optical systems and fiber optic-based networks.

BRIEF DESCRIPTION OF THE DRAWINGS

The present invention will be understood more fully from the detailed description that follows and from the accompanying drawings, which however, should not be taken to limit the invention to the specific embodiments; shown, but are for explanation and understanding only.

DETAILED DESCRIPTION

A photonic switch for use in an optical communication network is described. In the following description numerous specific details are set forth, such as angles, material types, configurations, etc., in order to provide a thorough understanding of the present invention. However, persons having ordinary skill in the opto-electronics arts will appreciate that these specific details may not be needed to practice the present invention.

According to one embodiment of the present invention, a photonic switch utilizing a tilting actuator-mirror assembly is provided to control the path of a light beam for use in a fiber optic communication network (e.g. an all-optical switch). The present invention also has numerous other consumer, medical, and/or industrial applications. For example, laser marking, optical scanning devices, Windshield auto projection, helmet display, personal digital assistant ("PDA") and mobile phone projection display, to name a few, can all benefit from the present invention.

In another embodiment of the present invention, in an optical switch light is guided by a fiber through a collimator, which forms the divergent light rays into a round beam having a specific beam width, onto a first mirror. The first mirror is part of an actuator-mirror assembly that can be tilted to reflect the light beam onto a second mirror. The second mirror is also part of an actuator-mirror assembly that is used to tilt the mirror along x and y-axes. A plurality of actuator-mirror assemblies is arranged in a matrix in which rows or columns of actuator-mirror assemblies are attached to one or more connector bars. The number of actuator-mirror assemblies on a connector bar and the number of bars per matrix depends on the particular application, for example, the port count of a switch.

According to one embodiment, a photonic switch utilizing a dual-axis tilting actuator is provided as a rotary moving coil actuator suspended by a flexing, electrically conductive gimbal component. The gimbal is comprised of a pair of beams that move about the axis of rotation under the influence of an electromagnetic actuator. The conductive connections in the rotary moving coil actuator are integrated with the flexing part of the gimbal. In various embodiments, the actuator may rotate about either a single axis or a dual axis.

Figure 1:
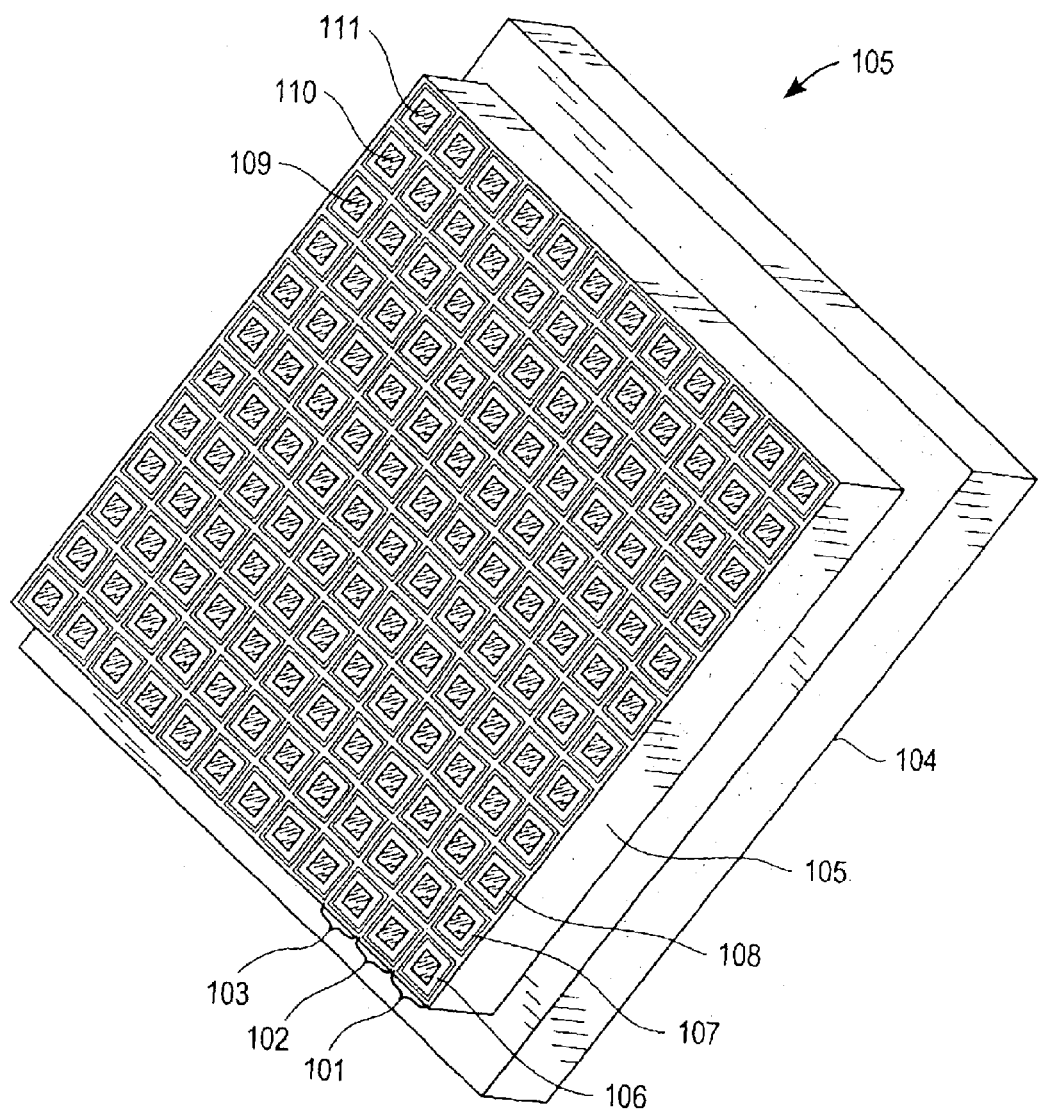
FIG. 1 is a top perspective view of an actuator-mirror matrix assembly in accordance with one embodiment of the present invention.

FIG. 1 is a perspective view of an actuator-mirror matrix assembly 105 in accordance with one embodiment of the present invention. By way of example, actuator-mirror matrix assembly 105 may be used as a photonic switch for fiber optic communication applications. A photonic switch is typically used to provision the path of light in a fiber optic communication network, In the example of FIG. 1, assembly 105 includes actuator-mirror bars (e.g., 101, 102, 103, etc.), each of which comprises two rows of individual actuator-mirror assemblies (e.g., mirror assemblies 106–111, etc.). The actuator-mirror bars are supported by a platform 104 that may also provide electrical connection to the individual actuators. In the particular embodiment shown, platform 104 comprises an aluminum block that supports the bars and also facilitates connection of the bars to a printed circuit board assembly. Matrix assembly 105 comprises six actuator-mirror bars, with each of the bars including 2 rows of 12 mirror plates per row (2×12), for a total of 144 mirror plates, which is sufficient to support a 72-port photonic switch. Each of the individual actuator-mirror assemblies includes a mirror plate that provides a highly reflective surface utilized to direct a laser beam, or other light beam.

It is appreciated that the number of actuator-mirror assemblies included on an actuator-mirror bar (i.e., the number of rows and columns) may vary, depending, for example, upon the port count of the photonic switch, or other system application.

Figure 2:
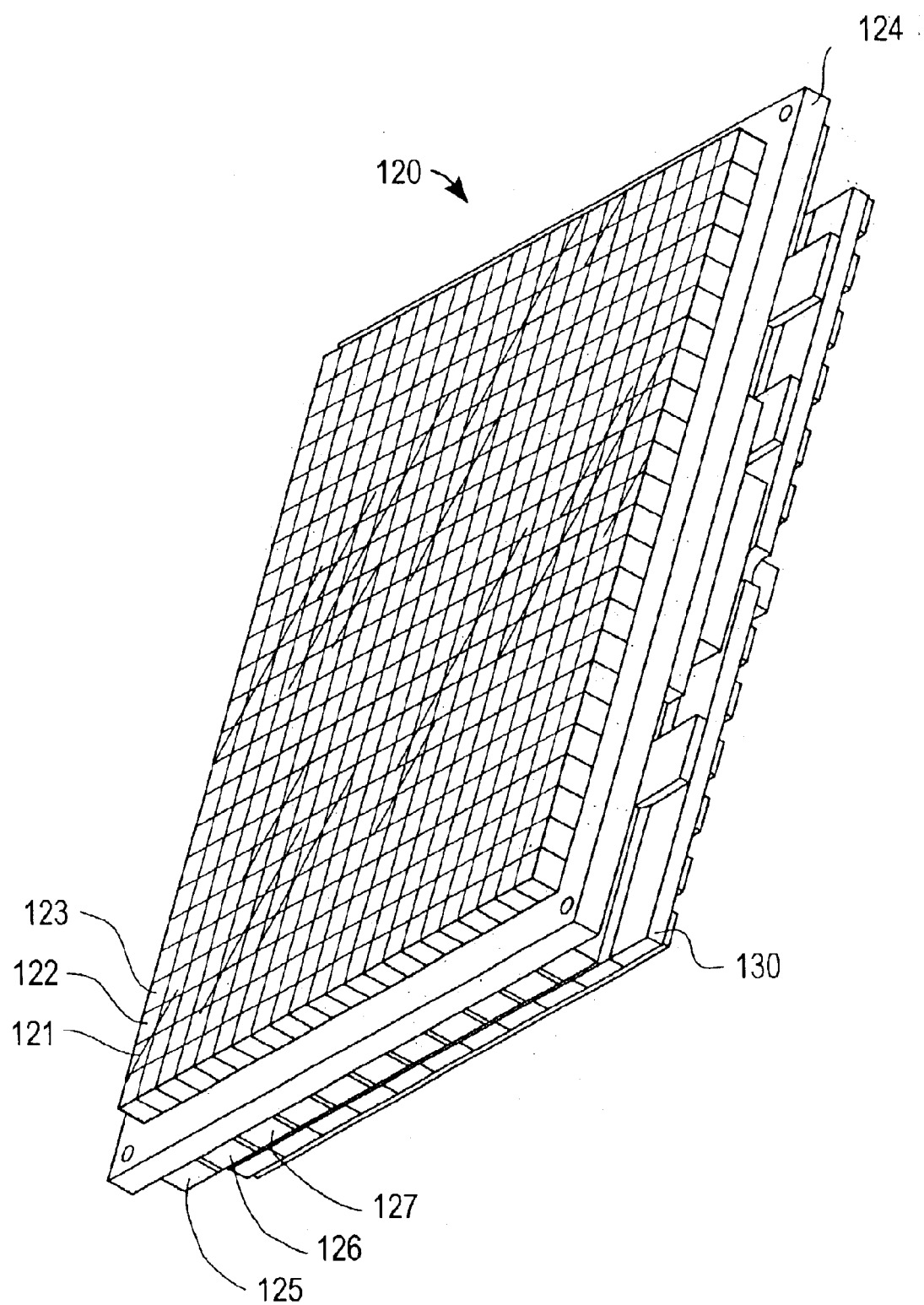
FIG. 2 is a perspective view of an actuator-mirror matrix assembly in accordance with an embodiment of the present invention.

FIG. 2 is a perspective view of an actuator-mirror matrix assembly 120 in accordance with another embodiment of the present invention. Individual actuator-mirror bars (125, 126, 127, etc.) are shown mounted to a platform 124. Each bar supports two rows of actuator-mirror assemblies (121, 122, 123, etc.). The reflective surface of each mirror faces outward in the matrix assembly of FIG. 2. A printed circuit board assembly ("PCBA") 130 is coupled to the underside of each of the bar assemblies 125, 126, 127, etc. to drive and control the actuators. The PCBA includes current driver integrated circuits ("IC's") and multiplexing circuitry that reduce the number of pin connections between the actuator-mirror matrix assembly 120 and a main PCB (not shown in this view). In the example shown in FIG. 2, gaskets or some other seal or packing may be included between the bars and the platform frame 124 to seal the assembly.

Figure 17:
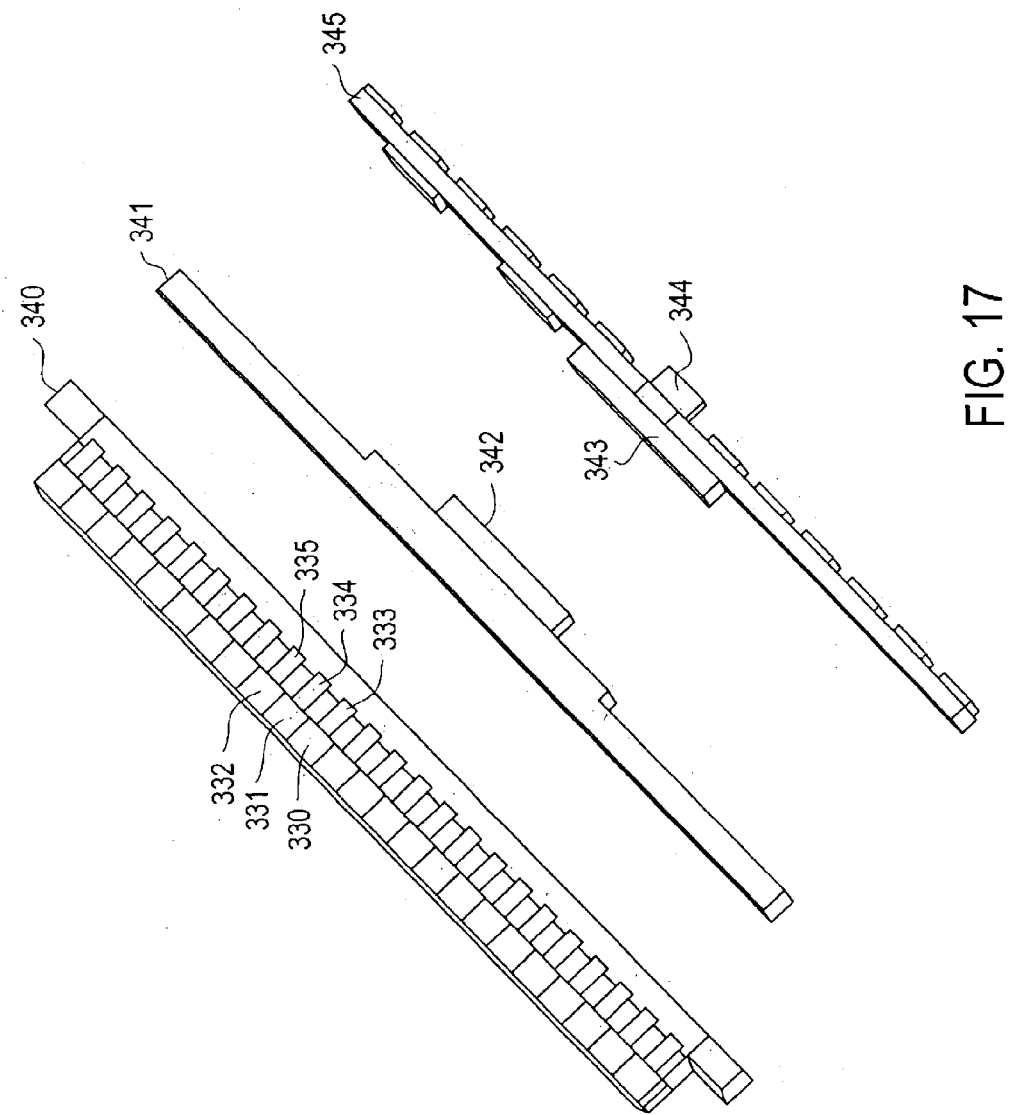
FIG. 17 is an exploded side view of a portion of the exemplary actuator-mirror matrix assembly of FIG. 2.

FIG. 17 is an exploded side view of a portion (i.e., a 2×24 bar) of the exemplary actuator-mirror matrix assembly of FIG. 2. Individual actuator-mirror assemblies (e.g., 330, 331, 332, etc.) are shown attached to corresponding actuator flex circuits (e.g., 333, 334, 335, etc.) The flex circuits provide electrical connection to the coils housed in each individual actuator-mirror assembly. The actuator-mirror assemblies and the actuator flex circuits are shown comprising bar assembly 340. An actuator bar connector 341 provides connection between the flex circuits of actuator bar assembly 340 and a printed circuit board assembly (PCBA) 345. The actuator bar flex circuit 341 includes a female pin connector 342 and the PCBA 345 includes a male pin connector 343.

PCBA 345 contains a variety of circuits for driving and controlling the actuator-mirror matrix assembly. Among the various components included on PCBA 345 are current driver IC's and multiplexing circuitry to reduce the number of pin connections between the actuator mirror bar assembly 360 and a main controller or main PCBA (not shown). PCBA 345 also contains a female pin connector 344 for providing power and control signals to PCBA 345 from a main controller or main PCBA. In this example, the PCBA 350 is the same size as the bar. As is described herein, each actuator-mirror assembly may include four coils, two of which are connected in series. Therefore, two dedicated power drivers may be used to drive each actuator-mirror assembly.

Figure 3:
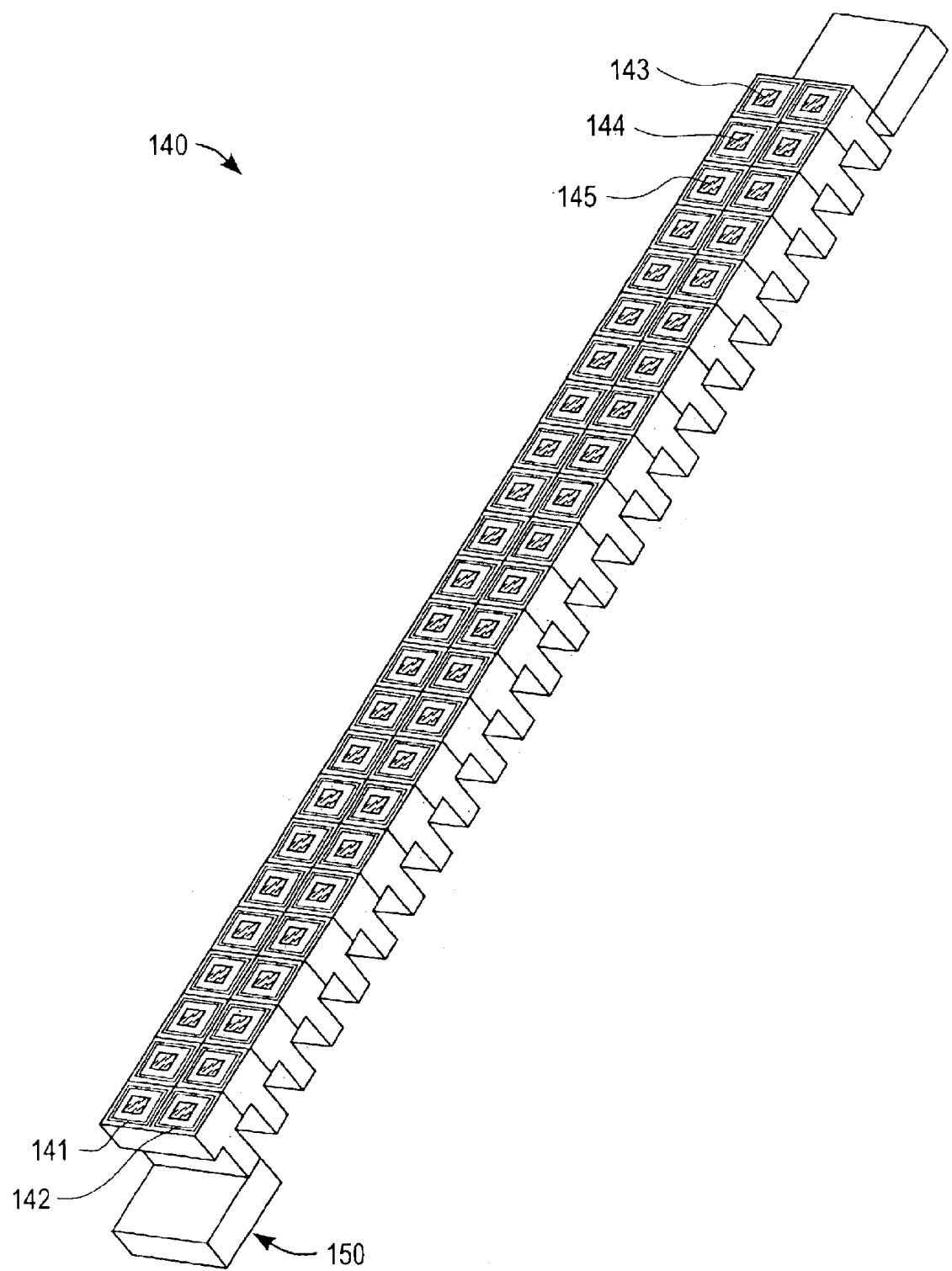
FIG. 3 is a perspective view of an actuator-mirror bar assembly in accordance with one embodiment of the present invention.

Referring now to FIG. 3 there is shown is a perspective view of a single actuator-mirror bar assembly 140 (and platform portion 150) in accordance with one embodiment of the present invention. Bar assembly 140 comprises a support bar 150 that supports two columns (i.e., 141 & 142) by twenty-four rows of individual actuator-mirror assemblies (143, 144, 145, etc.) for a total of forty-eight actuator-mirror assemblies. The number of the actuator-mirror assemblies and the number of bar assemblies per matrix (shown in FIGS. 1 & 2) depend on the particular application. For instance, if the actuator-mirror bar assembly 140 were to be used in an all-optical switch of a fiber communication network, the number of actuator-mirror assemblies included on each bar would depend on the port count of the switch.

Each of the actuator-mirror assemblies includes subassemblies, such as a mirror-gimbal assembly. These subassemblies may include the actuator wiring and the actuator power drivers. In some applications, the actuator-mirror assemblies may comprise rotary moving coil-object assemblies suspended by a flexing gimbal component that allows the mobile coil-object assembly to move in a desired manner.

Figure 4A:
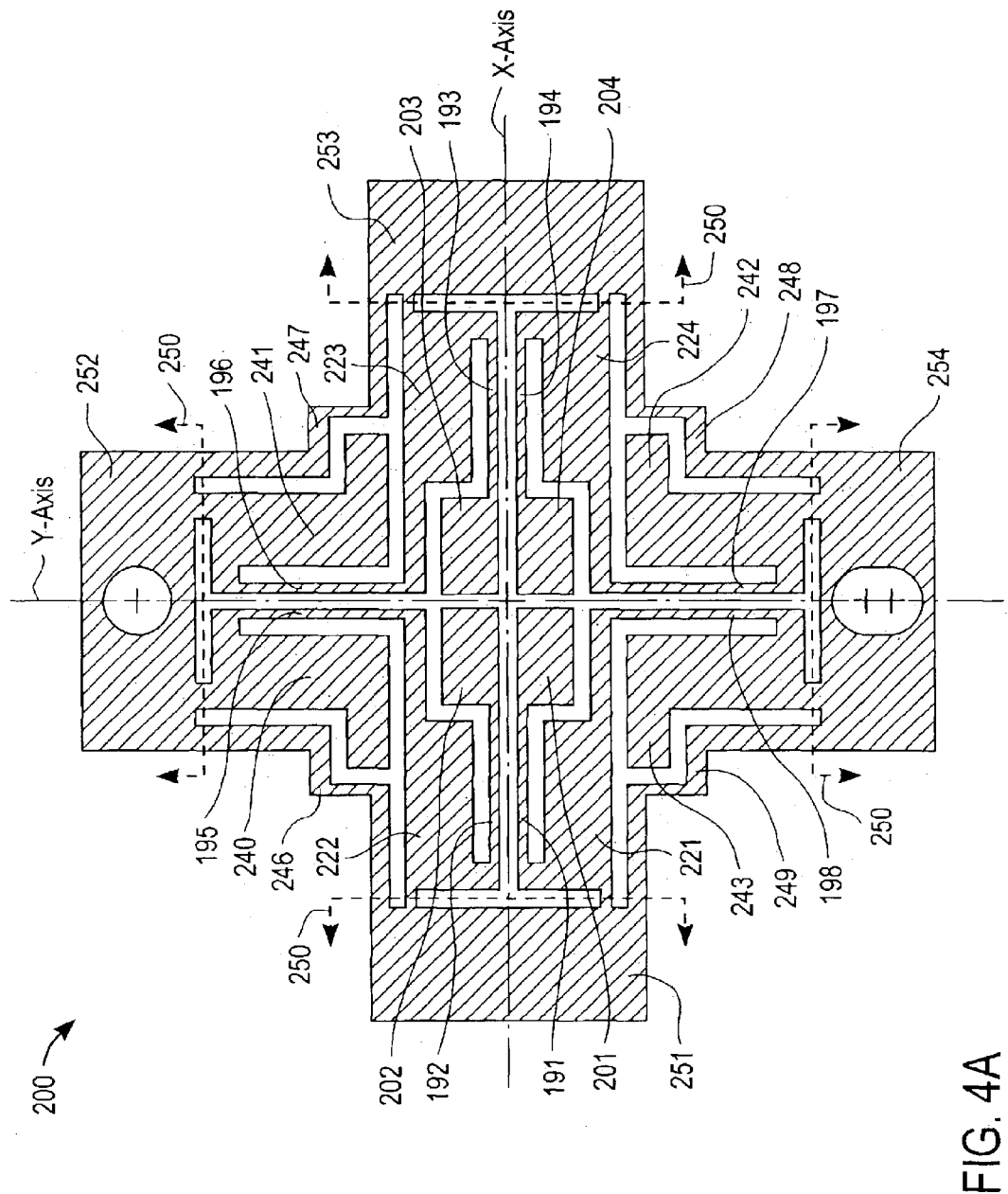
FIGS. 4A & 4B are top views of a gimbal used in accordance with one embodiment of the present invention.
Figure 4B:
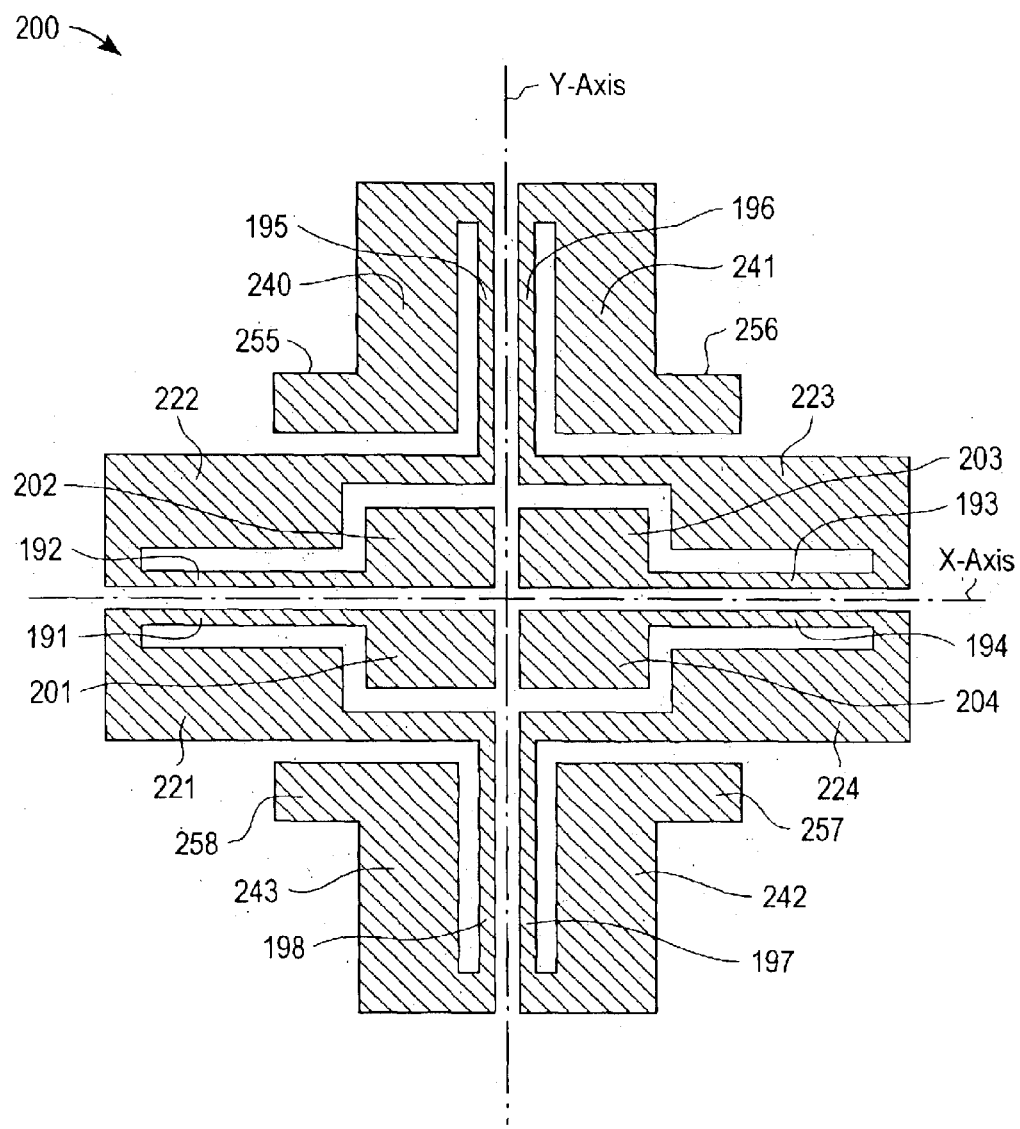

Referring now to FIGS. 4A & 4B, there is shown a top plan view of a gimbal 200 utilized in accordance with one embodiment of the present invention. Gimbal 200 is made from a single, integral sheet of thin metal. FIG. 4A shows gimbal 200 after removal of the "cutout" areas from the sheet metal. FIG. 4B shows the gimbal after removal of the end section and perimeter material, which step is performed during the construction of the actuator-mirror assembly according to one embodiment of the present invention.

The sheet metal used for gimbal 200 is preferably a fully hardened material, such as stainless steel, having high fatigue strength. Other materials providing similar properties may also be used. The material selected should allow the gimbal to rotate the attached mirror (or mirror-coil assembly) with a high rotational angle (e.g., +/15 degrees) over millions of movement cycles. The material may also be heat-treated. The sheet metal material is also preferably non-magnetic to prevent reluctance forces induced by the magnets in the actuator. In some cases, the sheet metal may also be coated with a corrosion-resistant material, such as titanium-nickel or gold.

Gimbal 200 comprises four attachment pads 201–204 that are centrally located symmetrical about the x-axis (i.e., longitudinal axis) and y-axis (i.e., transverse axis). A mirror, or mirror-pedestal assembly, is adhesively attached to pads 201–204. Thus, in the completed assembly, pads 201–204 are all affixed in a rigid plane, remaining stationary or moving in unison, depending on the particular embodiment of the final actuator-mirror assembly. Thin, elongated beams 191–194 support each of pads 201–204, respectively. In operation, pairs of adjacent beams 191 & 192 and 193 & 194 each twist longitudinally about the x-axis to permit the mirror (attached to pads 201–204) to rotate about the x-axis.

In FIG. 4A, beams 191 & 192 are shown being integrally connected to end section 251 through respective intermediate sections 221 & 222. Similarly, beams 193 & 194 are integrally connected to end section 253 through intermediate sections 223 & 224, respectively. Intermediate sections 221–224 are also integrally connected with thin, elongated beams 195–198, respectively, which permit rotation of the mirror about the y-axis. During rotation of the mirror about the x-axis, pairs of adjacent beams 195 & 196 and 197 & 198 remain substantially rigid. Similarly, during rotation of the mirror about the y-axis, pairs of adjacent beams 195 & 196 and 197 & 198 twist longitudinally about the y-axis, while pairs of adjacent beams 191 & 192 and 193 & 194 remain substantially rigid.

Beams 195 & 196 are shown in FIG. 4A being connected to end section 252 via respective L-shaped mounting sections 240 & 241. Likewise, beams 197 & 198 are both integrally connected to end section 254 through respective L-shaped mounting sections 242 & 243. All of the end sections 251–254 are attached together through a set of perimeter connecting sections 246–249. For example, end section 251 attaches to end sections 252 & 254 via connecting sections 246 & 249, respectively. End section 253 attaches to end sections 252 & 254 via connecting sections 247 & 248, respectively. In this embodiment, end sections 251–254 (beyond dashed lines 250 in FIG. 4A) are removed along with the perimeter connecting sections during the assembly process. FIG. 4B shows gimbal 200 after these metal sections have been removed. This assembly process of this embodiment is described in more detail below.

Figure 5:
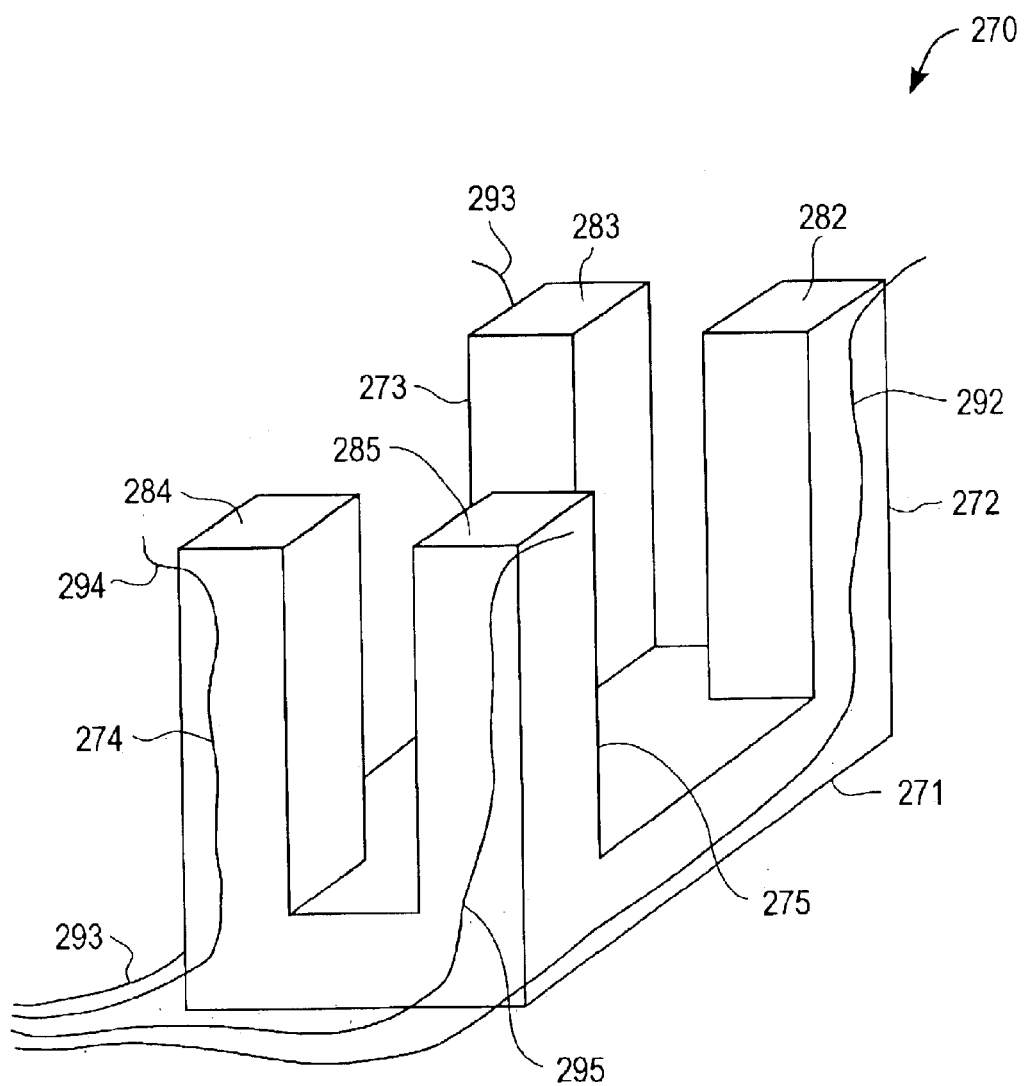
FIG. 5 illustrates a platform that mounts to the gimbal of FIGS. 4A & 4B in an actuator-mirror assembly according to one embodiment of the present invention.

Each of the mounting sections 240–243 of gimbal 200 is fixedly mounted (e.g., with adhesive) to a stationary point or platform mount of the actuator-mirror assembly. FIG. 5 shows one possible implementation of a platform 270 that may be used for this purpose. Platform 270 comprises a base 271 that supports four rigid posts 272–275 of equal height. Each of the posts 272–275 has a flat end surface 282–285, respectively. The dimensions of end surfaces 282–285 and the position of posts 272–275 is such that end surfaces 282–285 align with the rectangular surface areas of mounting sections 240–243 (see FIG. 4B) in a corresponding manner. This permits the mounting sections 240–243 to be adhesively attached to corresponding end surfaces 282–285.

FIG. 5 also shows a set of four thin wires 292–295, each of which is adhesively bonded to respective posts of platform 282–285. These wires connect with the coils that comprise the actuator of the final assembly. Two of the wires are used to energize the coils disposed about the x-axis, and the other two are used to energize the coils disposed about the y-axis.

After gimbal 200 has been mounted to platform 270 each of the wires 292–295 are soldered to corresponding tabs of the mounting sections 240–243. For example, if surface 282 is attached to mounting section 240, wire 292 may be soldered to tab 255. Continuing with this example, with surfaces 283–285 respectively attached to mounting sections 241–243, wires 293–295 may be soldered to tabs 256–258, respectively. Note that in gimbal 200 of FIG. 4B each of tabs 255–258 provides separate electrical connection with respective pads 202, 203, 204, and 201. This feature is utilized to establish electrical connection to the coils of the actuator-mirror assembly, as discussed in more detail shortly.

Metal may be removed from a single piece of thin sheet metal to achieve the gimbal cutout patterns shown in FIGS. 4A & 4B using a variety of conventional methods, such as chemical, etching, press cutting, milling, etc. Although a specific rectilinear cutout pattern is shown in these figures, it is understood that other embodiments may have different patterns or a different arrangement of beams, pads, etc., yet still provide rotational movement along the x and y axes in accordance with the present invention.

In the embodiment illustrated by FIGS. 4A & 4B, beams 191–198 are each about 0.05 mm wide, mirror-attachment pads 201–204 are each about 0.4 mm×0.6 mm in dimension, and the thickness of the single piece of sheet metal is about 0.0254 mm. Wires 292–295 are also about 0.0254 mm thick. In certain embodiments, beams 191–198 may be partially etched to make them thinner than the rest of the sheet metal material. For example, beams 191–198 may be chemically etched to a thickness less than 0.0254 mm to increase flexibility and thus achieve a higher degree of rotation.

Figure 6:
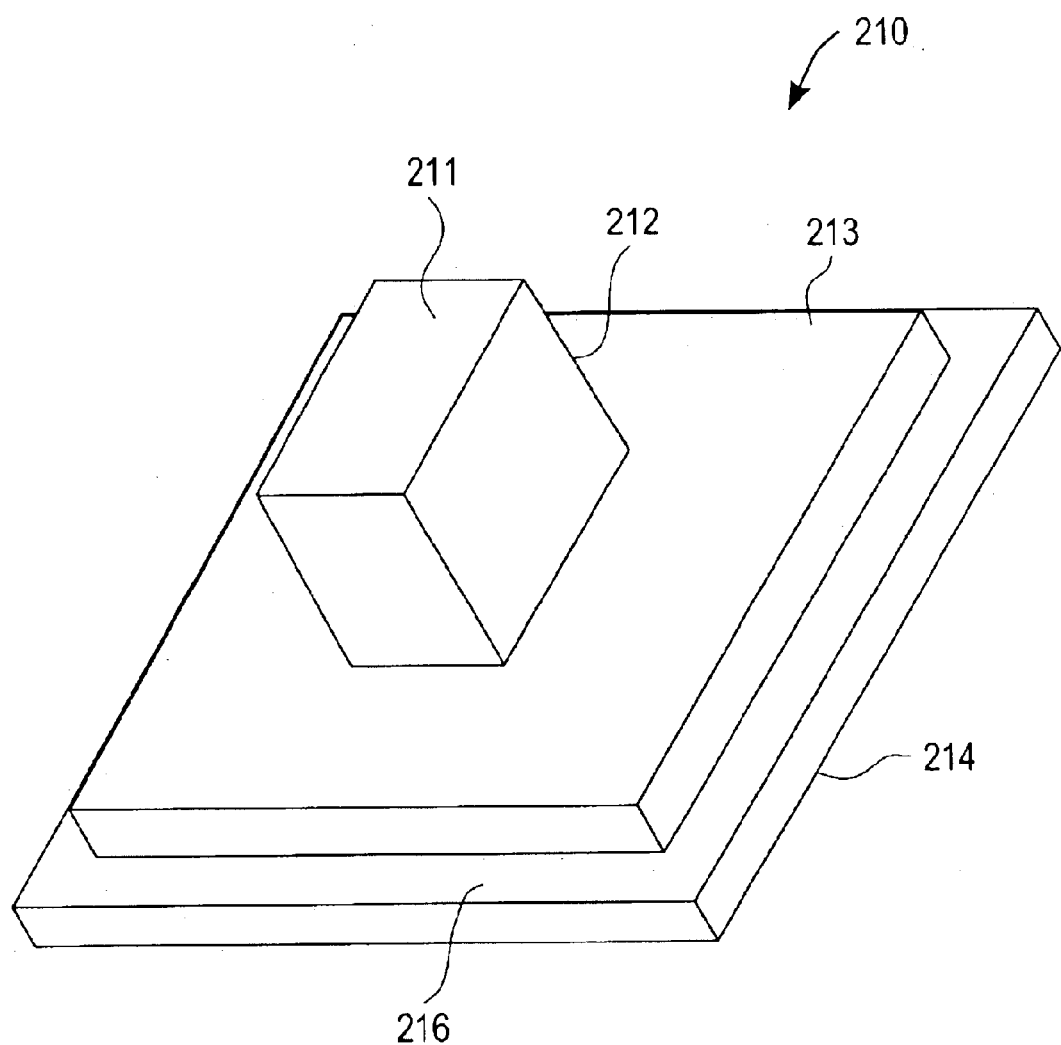
FIG. 6 is a bottom perspective view of an integrated mirror/pedestal 210 utilized in accordance with one embodiment of the present invention.

FIG. 6 is a bottom perspective view of an integrated mirror/pedestal 210 utilized in accordance with one embodiment of the present invention. In the drawing, the polished, reflective surface of mirror 214 faces down and into the page. Integrated mirror/pedestal 210 may be manufactured from a single piece of material such as silicon, Pyrex®, quartz, sapphire, aluminum, or other types of suitable materials. Integrated mirror/pedestal 210 includes a pedestal portion 212 having a flat surface 211. The length and width of surface 211 is such that it matches or fit within the combined area of pads 201–204 (see FIG. 4B). During the assembly process, surface 211 is adhesively bonded to one side of pads 201–204.

Integrated mirror/pedestal 210 also includes a base plate 213 between pedestal portion 212 and the back of mirror 214. Base plate is sized smaller than mirror 214 such that a step 216, comprising a peripheral area of the back of mirror 213, is realized. It is appreciated that other embodiments may be constructed from discrete parts (e.g., separate mirror, base plate, and pedestal) rather than being manufactured in integral form. In either approach, the mirror may be about 0.25 mm thick and 2×2 mm in area. The mirror surface may be lapped to a highly polished optical-flat surface. A reflective surface can also be applied by numerous methods, including plating or sputtering gold, silver, or aluminum on a layer of nickel.

Figure 7:
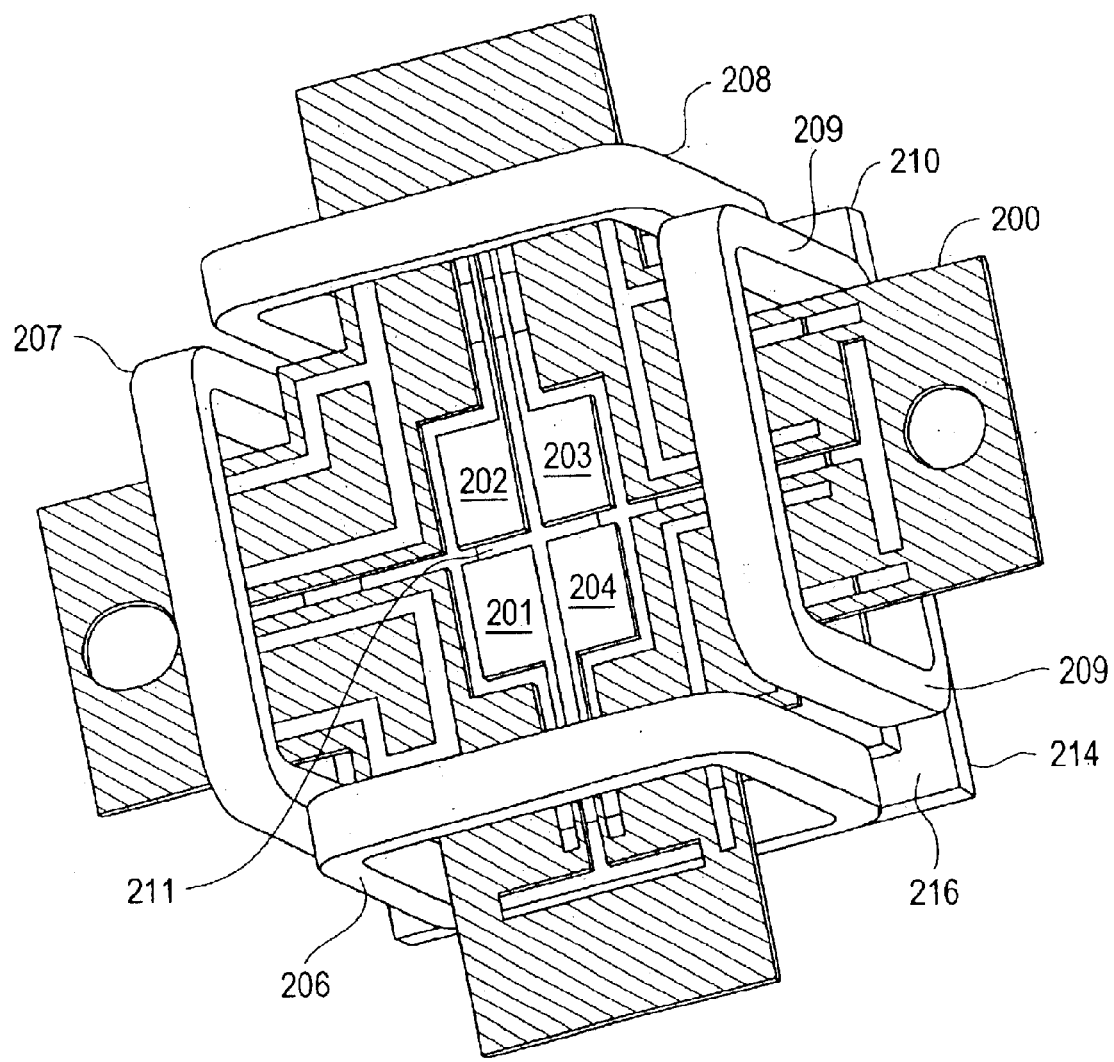
FIG. 7 illustrates an actuator-mirror assembly at an intermediate point of construction according to one embodiment of the present invention.

FIG. 7 shows a bottom perspective view of an actuator-mirror assembly after pads 201–204 have been bonded to surface 211 of integrated mirror/pedestal 210. FIG. 7 also shows four coils 206–209 adhesively bonded to step 216 around the side back surface of mirror 214. Thus, coils 206–209, mirror 214, and pads 201–204 of gimbal 200 are all rigidly coupled together, and move as a single unit, in the actuator-mirror assembly according to one embodiment of the present invention. Note that although FIG. 7 shows the end sections of gimbal 200 before removal at this stage of the assembly process, this is not required. That is, the end and peripheral connecting sections of gimbal 200 may be removed either before or after attachment to the mirror/pedestal assembly.

Figure 8:
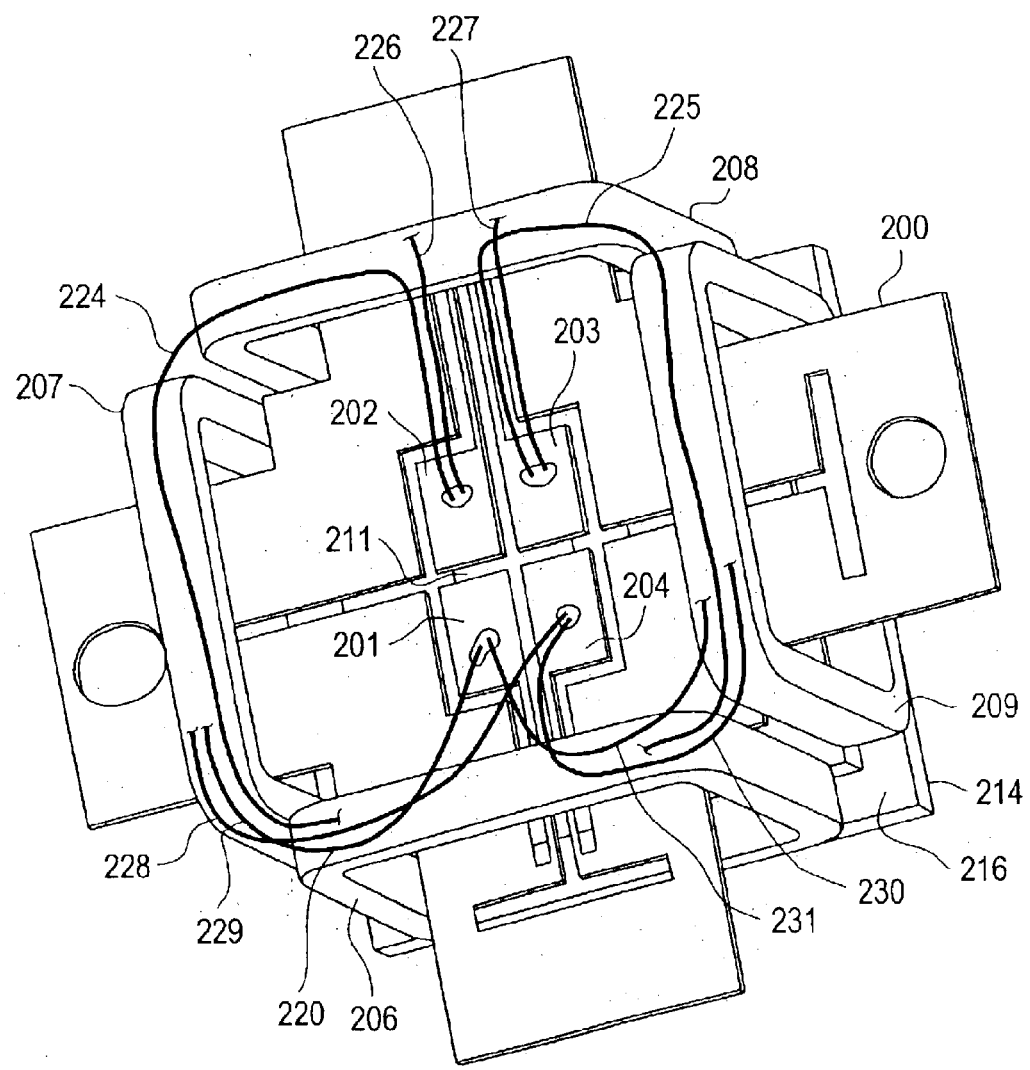
FIG. 8 illustrates an actuator-mirror assembly at a further point of construction according to one embodiment of the present invention.

FIG. 8 is another view of the assembly of FIG. 7 after soldering of pairs of coil wires to the back of pads 201–204. (Note that not all of the cutout portions of the gimbal are shown in this view for clarity reasons.) For example, wires 226 & 227 of coil 208, and wires 224 & 225 of coil 206, are shown soldered to pads 202 & 203, respectively. Similarly, wires 228 & 229 of coil 207, and wires 230 & 231 of coil 209, are soldered to pads 204 & 201, respectively.

Upon removal of the end sections of gimbal 200, each of the pads 201–204 is electrically connected to a separate one of the mounting sections 240–243. In other words, removal of the end sections of the gimbal creates four distinct conductive paths in the remaining sheet metal material from each of the four mounting sections to a corresponding one of the pads 201–204. According to one embodiment of the present invention, current flows through these four paths to control movement of the attached mirror via coils 206–209. This embodiment therefore utilizes the metal of gimbal 200 to conduct electrical current delivered to the moving coil. That is, the electrical connections to the coil wires are integrated with the flexing part of the gimbal. This arrangement thereby eliminates movement of wires during operation of the mirror-gimbal assembly.

Following attachment of the gimbal to platform 270 (see FIG. 5) wires 292–295 may be soldered to tabs 255–258 to establish an electrical connection to coils 206–209. Thus, the conductive paths provided through the flexing beams of gimbal 200 may be used to energize the coils in order to control tilting of the mirror along the x-axis and the y-axis. By way of example, one pair of wires 292–295 may be used to energize one pair of opposing coils (i.e., coils 207 & 209) to control rotation of the mirror about the x-axis, with the remaining pair of Wires 292–295 being used to energize the other pair of opposing coils (i.e., coils 206 & 208) to control rotation of the mirror about the y-axis. In the final assembly, permanent magnets are attached within the central opening of each of the coils 206–209.

Torque is developed on the mirror-coil assembly upon application of an appropriate current through the coils, in the presence of the permanent magnetic field. The direction of the force is made to be opposite on each side of the mirror-coil assembly such that the resulting torque rotates or tilts the mirror attached to the top of gimbal 200. Since the mirror-coil assembly is fixedly attached to gimbal 200, gimbal pads 201–204 and mirror 214 rotate together as the mirror-coil assembly rotates. When the applied current is interrupted or halted, the restoring spring force of gimbal 200 returns the assembly to a rest position.

Figure 9:
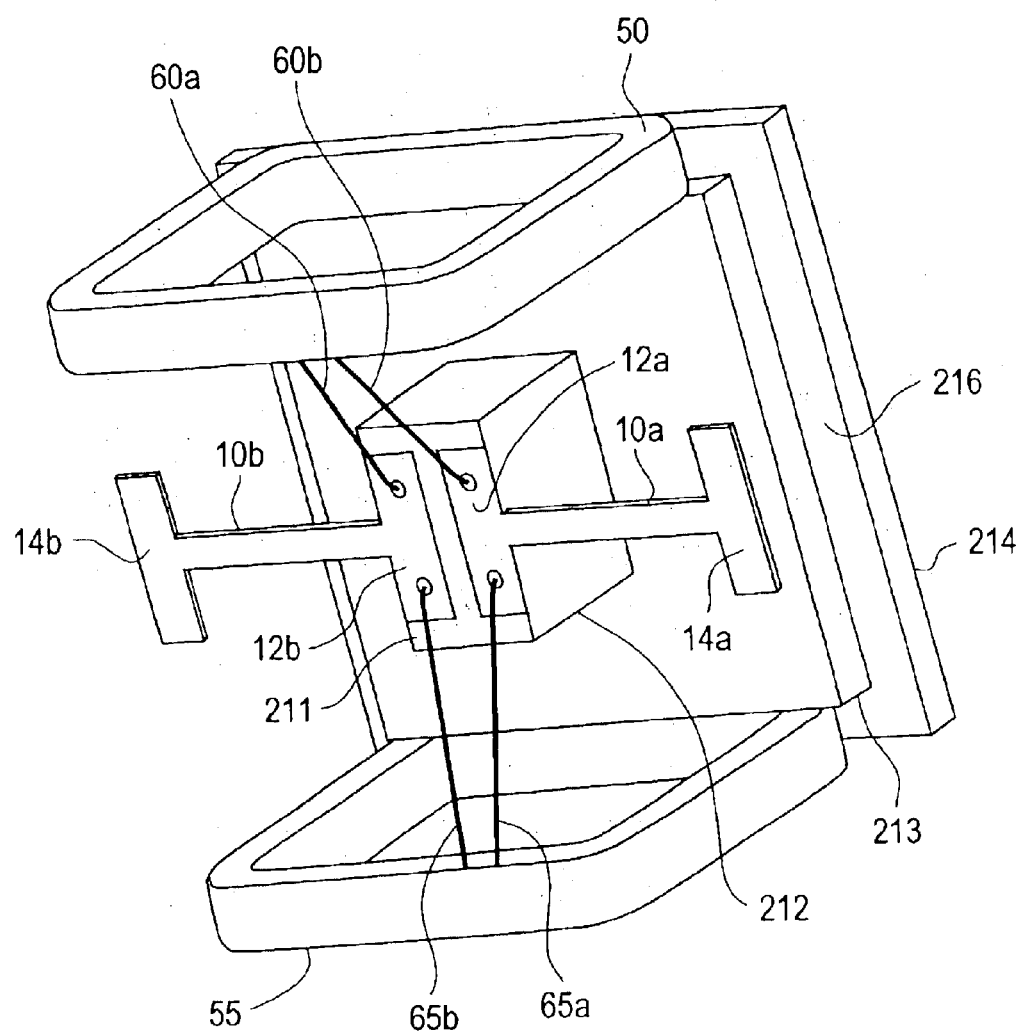
FIG. 9 is a perspective view of an actuator-mirror assembly according to another embodiment of the present invention.

FIG. 9 is a perspective view of another embodiment of an actuator-mirror assembly according to the present invention. The actuator-mirror assembly shown in FIG. 9 rotates about a single axis. In this embodiment, two coils 50 and 55 are adhesively attached to step 216 on opposite sides of mirror 214 and base plate 213. The gimbal for this embodiment comprises two rectilinear, or I-bar, shaped members 10a & 10b of thin sheet metal. Ends 12a & 12b' of respective I-bar members 10a & 10b are bonded to surface 211 of pedestal 212. Wires 60a & 60b of coil 50 are soldered to ends, 12a & 12b, respectively. Likewise, wires 65a & 65b of coil 55 are also soldered to ends 12a & 12b, respectively. A stationary platform similar to that shown in FIG. 5, but having two posts, supports the assembly of FIG. 9, with the end surfaces of the posts being bonded to ends 14a & 14b of I-bar members 10a & 10b. A wire attached to each of the mounting posts may be soldered to ends 14a & 14b to provide electrical connection through the gimbal members 10a & 10b to energize coils 50 & 55.

Figure 10A:
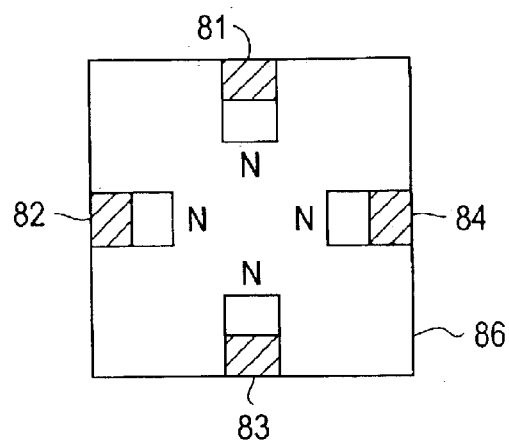
FIGS. 10A & 10B are top and side views of a magnet-housing arrangement for an actuator-mirror assembly in accordance with one embodiment of the present invention.
Figure 10B:
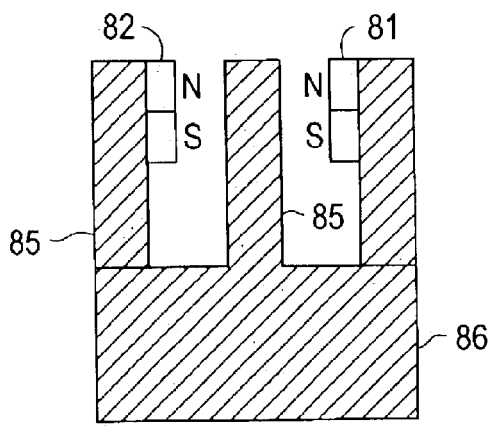

FIGS. 10A & 10B show top and side views of a magnet-housing arrangement for a single actuator-mirror assembly in accordance with one embodiment of the present invention. This magnet-housing arrangement, for example, may be utilized in the actuator-mirror assembly shown in FIG. 7. Magnets 81–84 are bonded on the side surfaces of steel returns 85, attached to a base 86. Magnets 81–84 are positioned adjacent the moving coils (e.g.; coils 206–209). The polarities of the magnets are shown by conventional nomenclature for north (N) and south (S). In one embodiment, the magnet material is Neodymium-Iron-Boron. Of course, other types of magnetic materials may be used as well.

Figure 11:
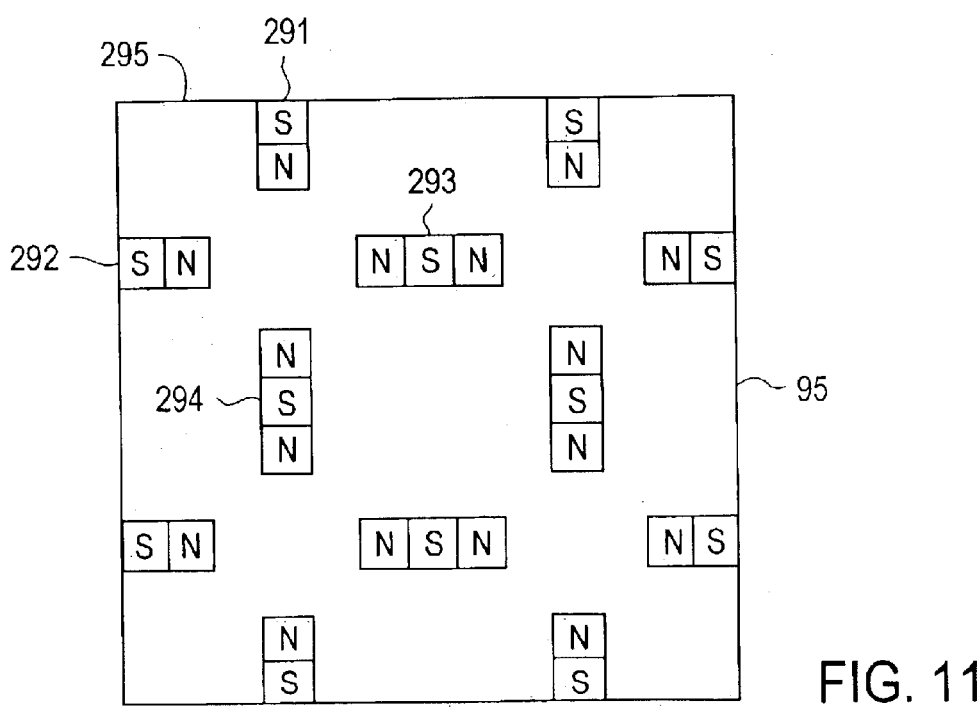
FIG. 11 is a top view of a magnet-housing arrangement for an actuator-mirror assembly in accordance with another embodiment of the present invention.

FIG. 11 shows a top view of a larger magnet-housing arrangement for use with multiple actuator-mirror assemblies.

Figure 12:
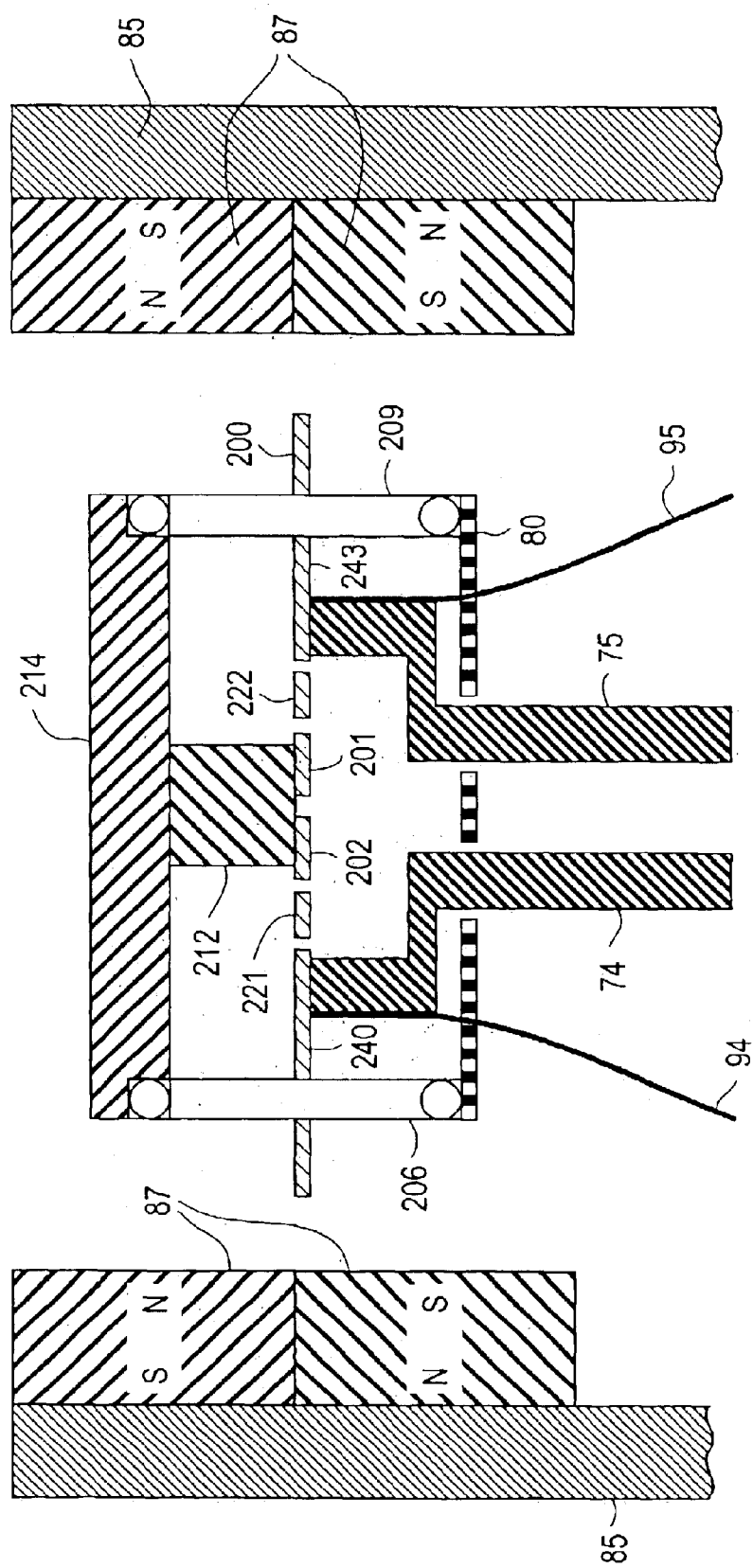
FIG. 12 is a cross-sectional side view of an actuator-mirror assembly according to one embodiment of the present invention.

FIG. 12 is a cross-sectional side view of an actuator-mirror assembly utilizing gimbal 200 according to one embodiment of the present invention. A pair of magnets 87 is shown attached to a steel return on opposite sides of the mirror-coil-gimbal assembly. One pair of magnets 87 are positioned adjacent coil 206, and the other pair of magnets 87 are positioned adjacent coil 209. Each of the coils is bonded to a notched edge surface of mirror plate 214. A pedestal 214 is shown attached to the back of mirror plate 214 and also to pads 201 & 202 of gimbal 200. The end surfaces of posts 74 & 75 are shown respectively bonded to mounting sections 240 & 243, with wires 94 & 95 soldered to sections 240 and 243 in accordance with the wiring scheme described above.

Also included in the cross-section of FIG. 12 is an optional balancing plate 80 attached to the bottom of the coils 206–209. Balancing plate 80 acts to counter-balance the weight of the mirror so that the center of rotation is at the center of gravity. This feature improves external shock and dynamic settling of the actuator. As shown in FIG. 12, balancing plate 80 comprises a solid, flat metal plate with several openings that allow the stationary posts to attach to the gimbal and also permit the gimbal-mirror-coil assembly to move. Instead of having-several openings to accommodate mounting of the mirror-coil-gimbal onto stationary posts, balancing plate 80 may also be implemented with a single, centrally located opening. For instance, balancing plate 80 may comprise a rectangular frame having its sides adhesively attached to the coils, as shown in FIGS. 13A & 13B.

The embodiment of FIG. 12 further illustrates the use of an optional damper coating 333, which covers beams 191–198 and gimbal pads 201–204. Damper coating 333 comprises a low viscosity polymer (e.g., an ultraviolet curing resin) that becomes a flexible gel upon curing. Damper coating 333 acts to damp gimbal resonances and improve the settling time of the actuator; yet, because coating 333 is flexible, it does not appreciably affect the stiffness of the gimbal. Damper coating 333 also improves reliability by minimizing the effect of external shock and vibration.

Figure 13A:
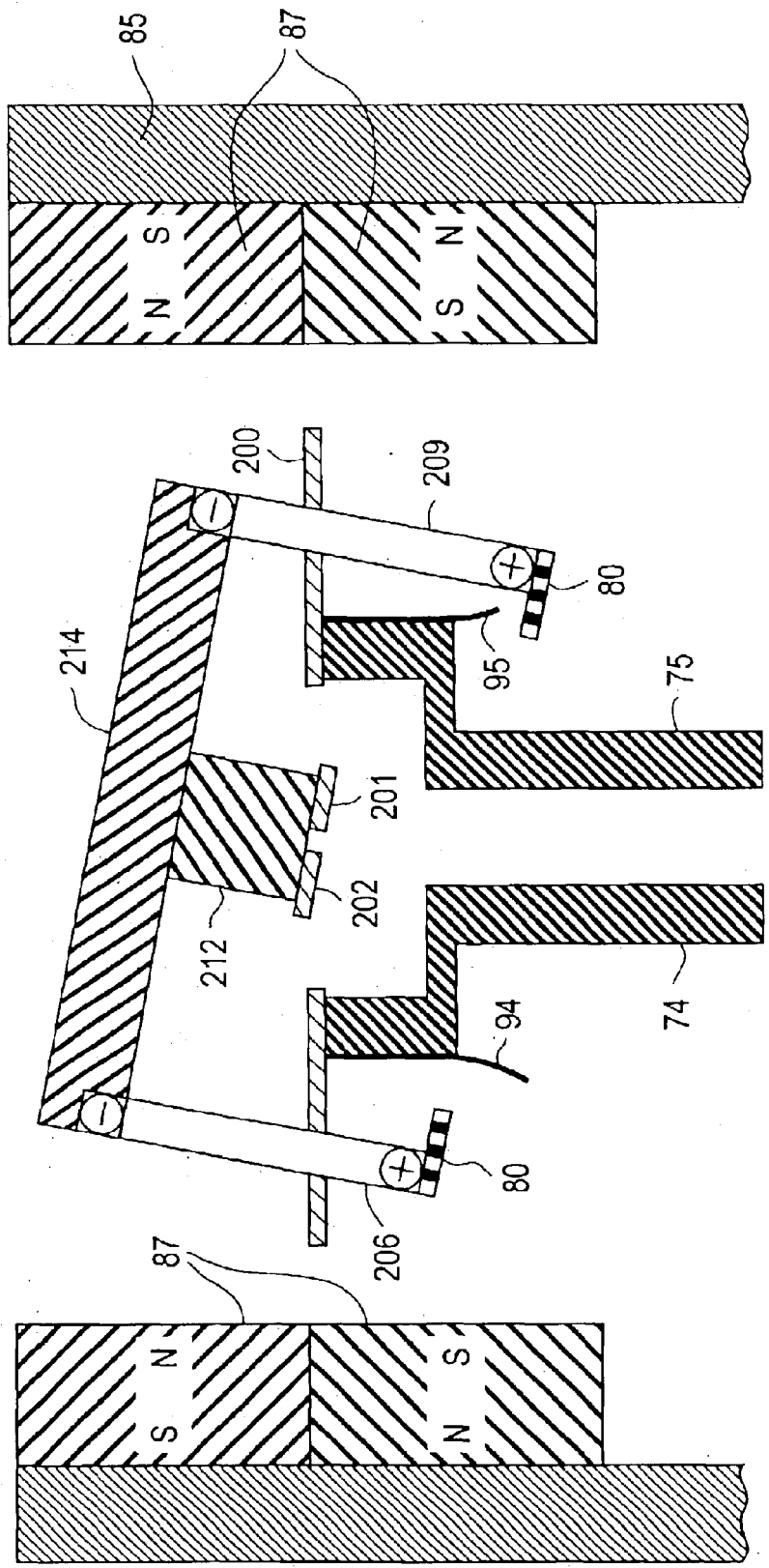
FIGS. 13A & 13B are cross-sectional side views of an actuator-mirror assembly tilted in two different directions in accordance with one embodiment of the present invention.
Figure 13B:
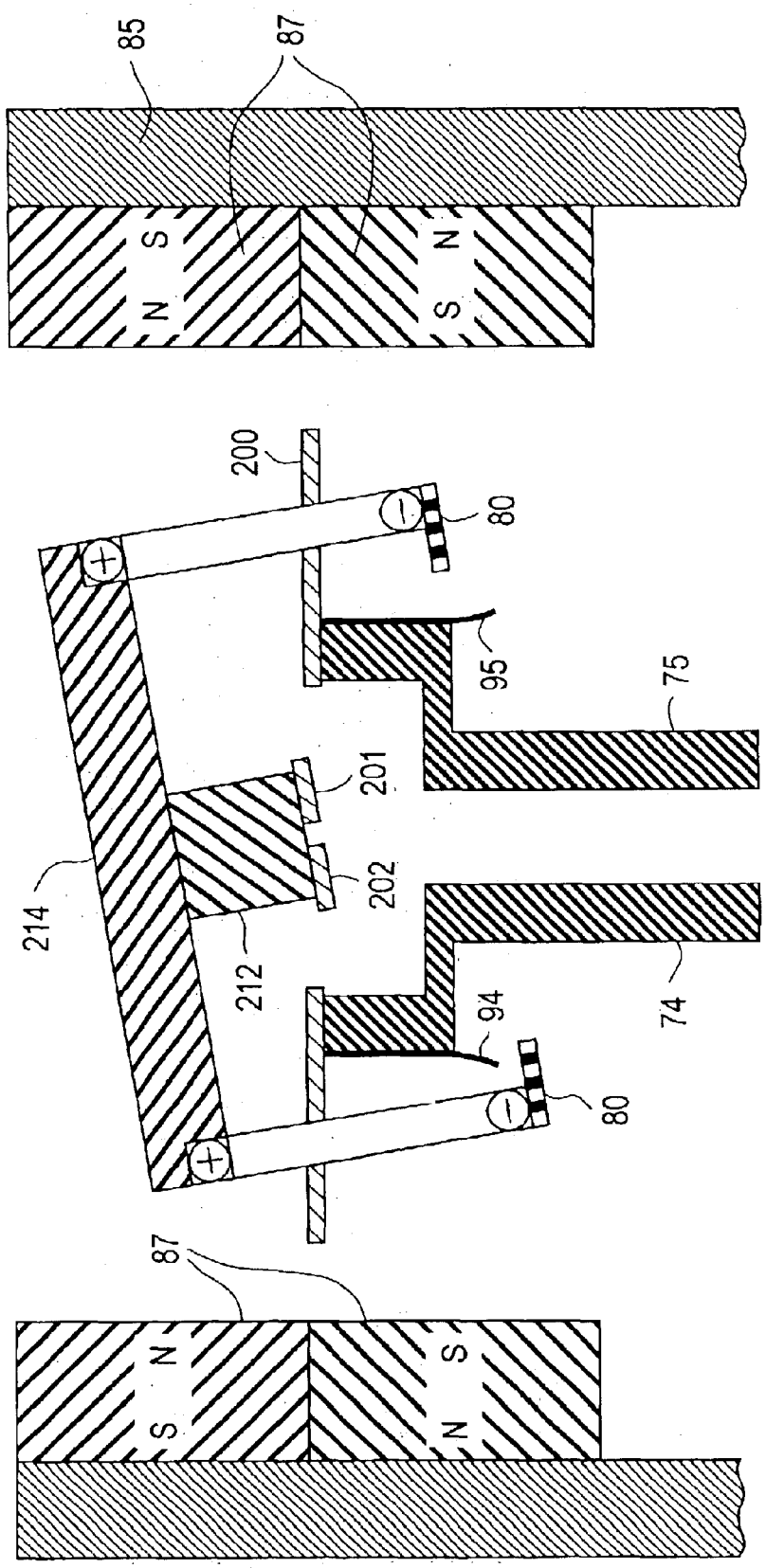

FIGS. 13A & 13B are cross-sectional side views of an actuator-mirror assembly with appropriate current applied to coils 206 & 209 to tilt mirror 214 in two different directions along a single longitudinal axis of movement. Note that in FIGS. 13A & 13B only the rigid sections of gimbal 200 are shown for clarity reasons. Precise movement of mirror 214 along both the x-axis and y-axis is achieved by controlling the current applied to the four coils 206–209 for the embodiments described above.

Figure 14A:
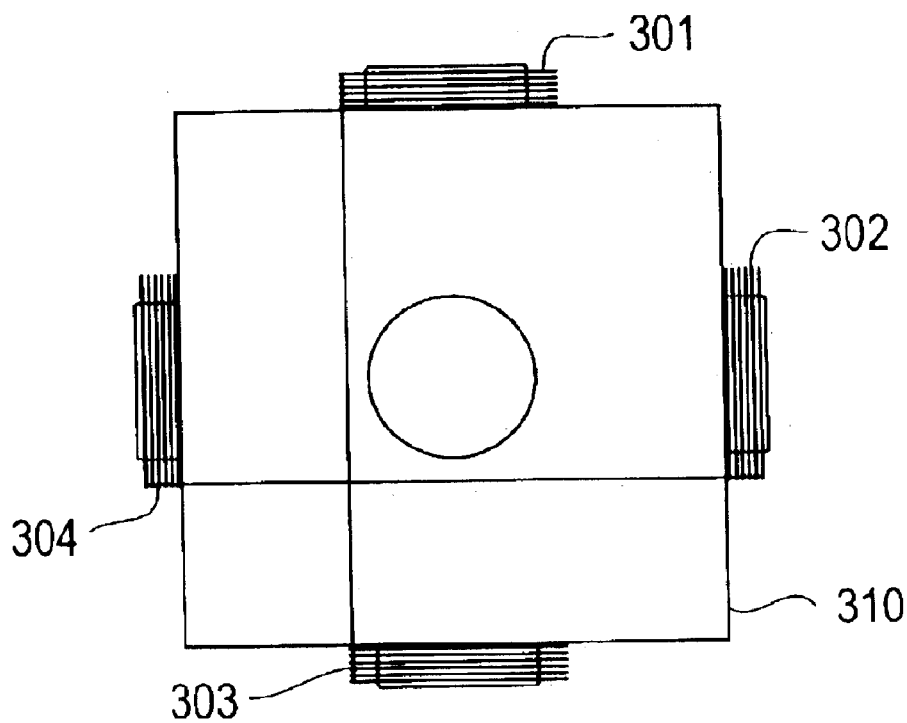
FIGS. 14A & 14B show top and side views of a bobbin coil assembly utilized in accordance with an alternative embodiment of the present invention.
Figure 14B:
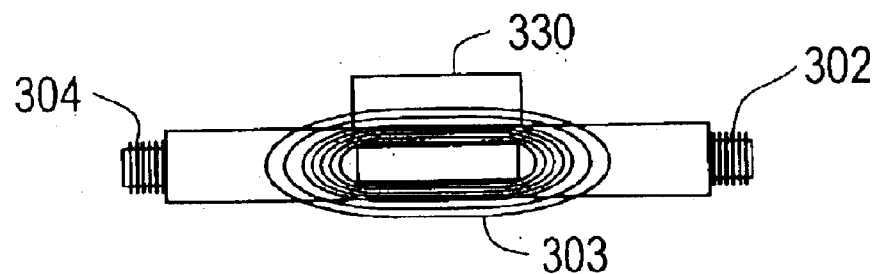
Figure 15:
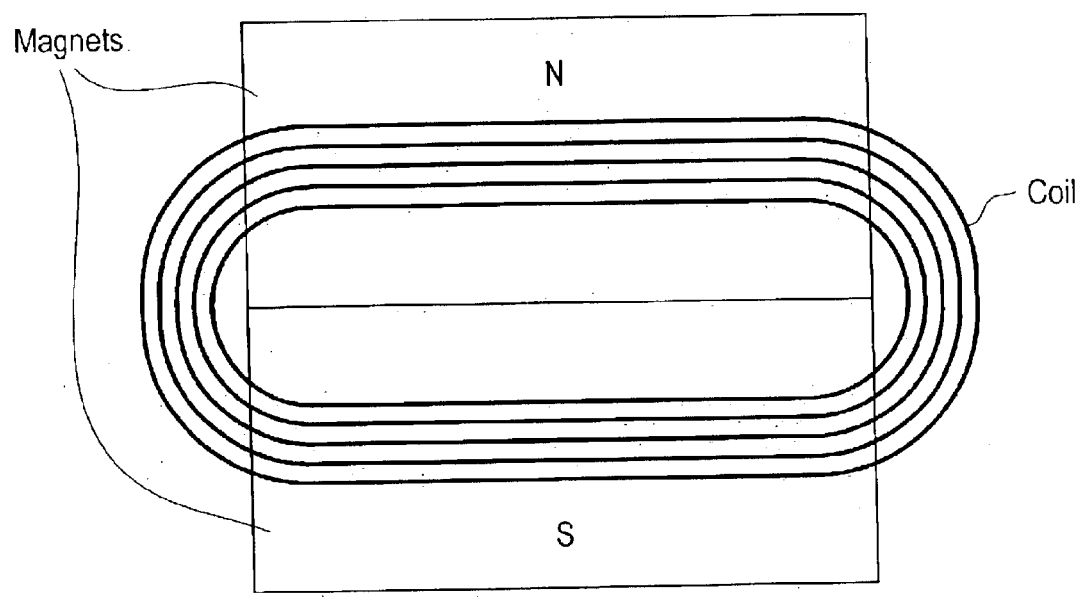
FIG. 15 illustrates the relative position of a coil and magnet assembly in accordance with one embodiment of the present invention.

FIGS. 14A & 14B show top and side views of a bobbin-coil assembly utilized in accordance with an alternative embodiment of the present invention. In this embodiment, the coils 301, 302, 303, and 304 are made from fine copper wire with single-built insulation, and are each wrapped around a post member on a side of bobbin 310. Coils 301, 302, 303, and 304 are physically located between one or more permanent magnets (not shown in this view) in the final assembly. FIG. 15 shows the relative position of a coil and magnet assembly in accordance with this alternative embodiment. The coil windings are supported by and encircle the protruding side members of bobbin 310, shaped in accordance with the dimensions of the permanent magnets. Bobbin pedestal 330 provides a surface for bonding (e.g., adhesive attachment) to a gimbal that suspends bobbin 310 between the permanent magnets.

By way of example, in the embodiment of FIGS. 14A & 14B, each coil may include approximately 48 turns made from 6 layers, with each layer having 8 turns. The number of turns and layers may vary based on the type of coil used, the application, etc. Bobbin 310 may be made from a variety of machined materials (e.g., polymers) as is known in the art. In operation, application of current through the coils generates a magnetic field that interacts with the field of the permanently mounted magnets to torque to tilt the actuator.

Figure 16:
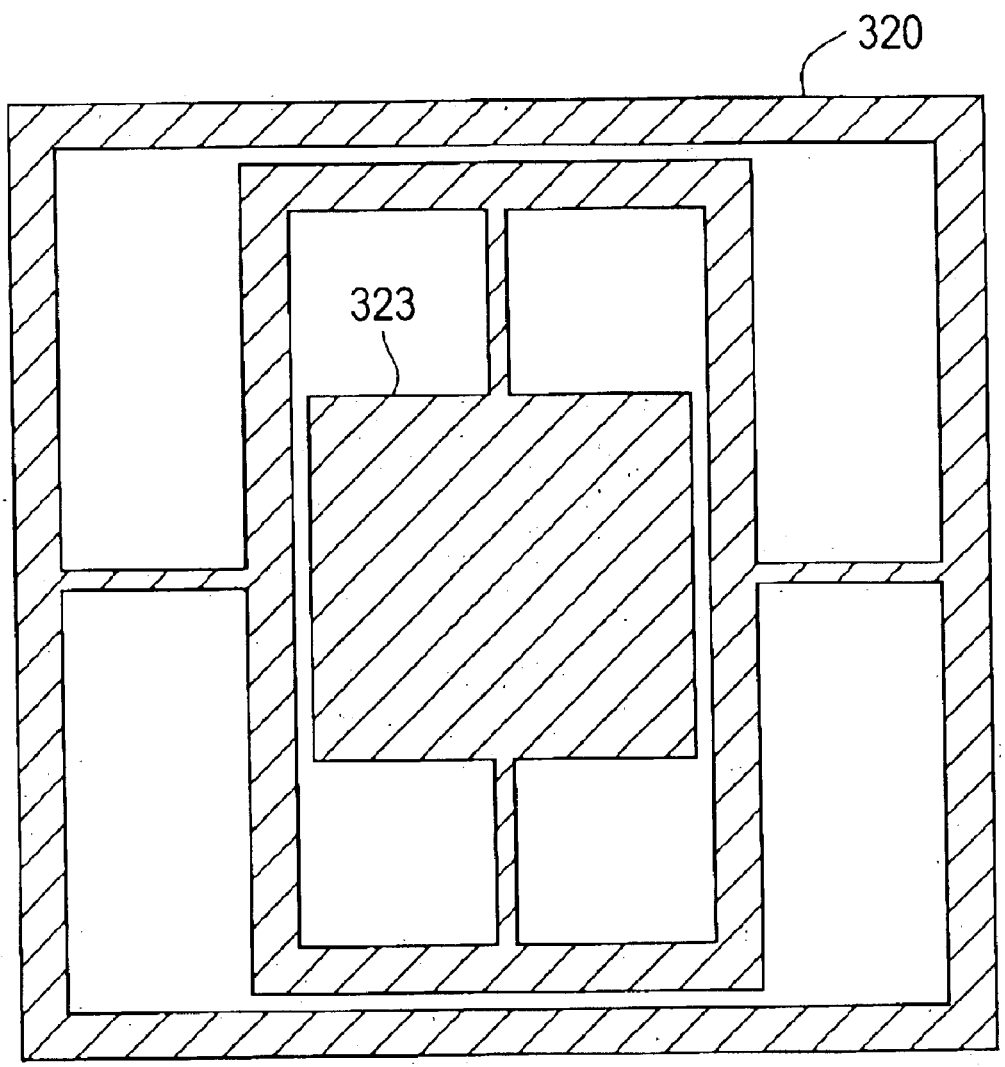
FIG. 16 is a top view of a gimbal utilized in accordance with an alternative embodiment of the present invention.

The bobbin coil assembly of FIGS. 14A & 14B may be bonded to a variety of conventional gimbals FIG. 16 shows a top view of a conventional gimbal 320 of a type well known in the industry, which may be used to suspend the bobbin-coil assembly shown in FIGS. 14A & 14B. Gimbal 320 is formed of a single sheet of material (e.g., sheet metal) that provides for dual-axis rotation of the bobbin-coil assembly. Bobbin pedestal 330 may, for instance, be bonded to central area 323 of gimbal 320.

Figure 18:
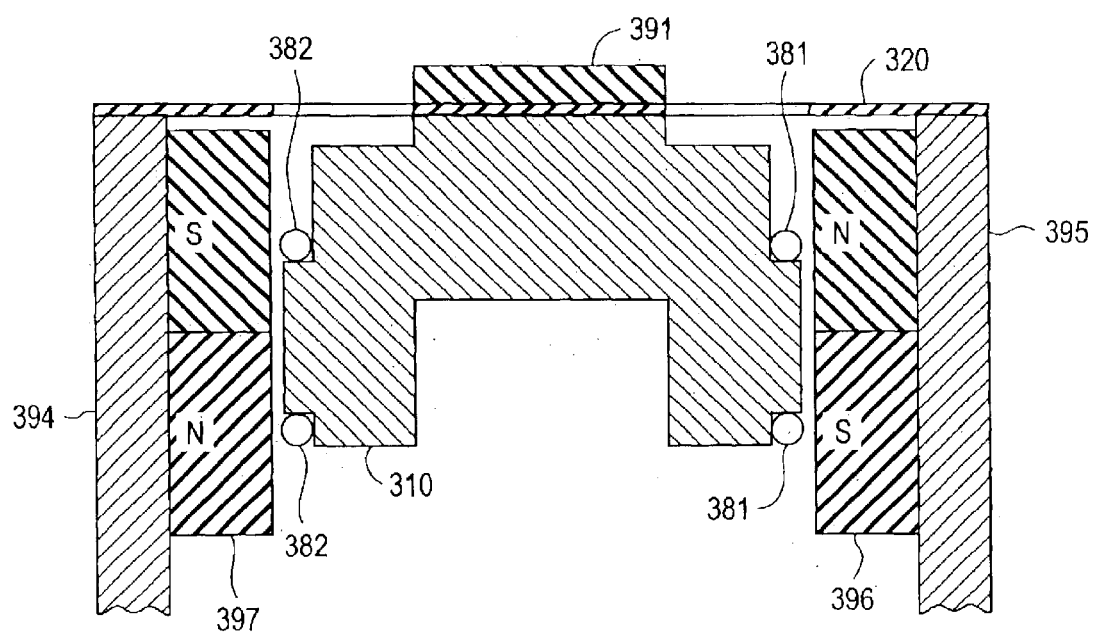
FIG. 18 is a cross-sectional side view of an actuator-mirror assembly in accordance with an alternative embodiment of the present invention.

FIG. 18 shows a cross-sectional side view of an actuator-mirror assembly in accordance with an alternative embodiment of the present invention. In this view, permanent magnets 396 & 397 are positioned on steel returns 395 & 394 adjacent coils 381 & 382, respectively. Coils 381 & 382 are located on opposite sides of a bobbin 310, which is bonded to the center of a gimbal 320, such as that shown in FIG. 16. In this example, gimbal 320 is secured to stationary steel returns 394 & 395. A mirror 391 is secured on the center-top area of gimbal 320.

Torque is developed on the bobbin-coil assembly upon application of an appropriate current through coils 381 & 382, in the presence of the permanent magnetic field. The direction of the force is made to be opposite on each side of bobbin 310 such that the resulting torque rotates or tilts mirror 391 attached to the top of gimbal 320. The bobbin-coil assembly is attached to a gimbal 320 and therefore the gimbal 320 and the mirror 391 will rotate as the bobbin-coil assembly rotates. When the applied current is interrupted or halted, the restoring spring force of gimbal 320 returns the assembly to the rest position shown in FIG. 18.

Figure 19:
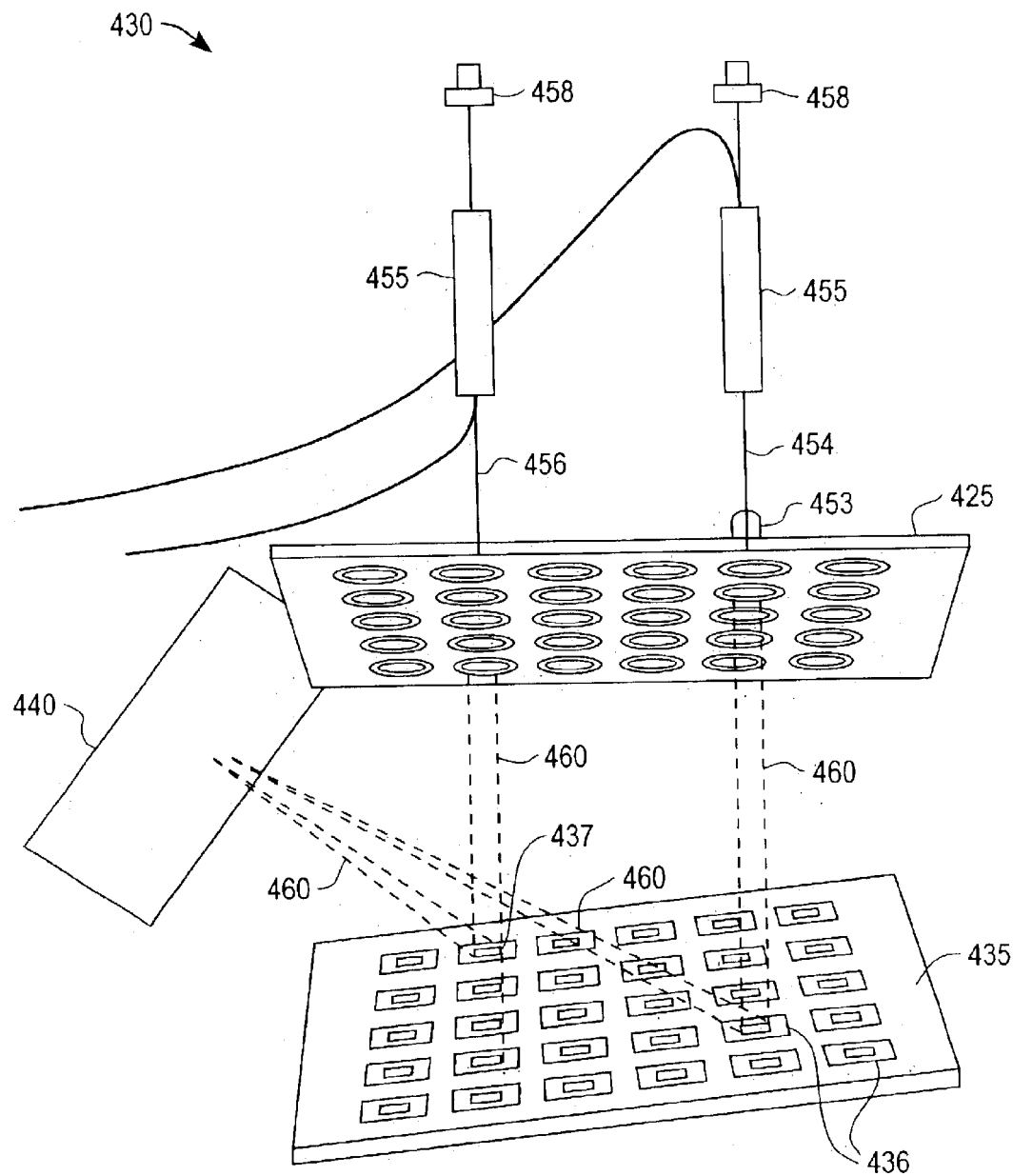
FIG. 19 illustrates a photonic switch module in accordance with one embodiment of the present invention.

FIG. 19 shows a photonic switch module 430 for use in an optical communication network in accordance with one embodiment of the present invention. The photonic switch module 430 shown in FIG. 19 includes a fiber lens matrix 425, a reference mirror 440, and an actuator-mirror matrix assembly 435, as described above. Fiber lens matrix 425 includes accurately drilled receptor holes. Each of the fiber-lens receptacles functions as an optical port, which, in the described embodiment includes an optical fiber coupler connected to a lens. The input portions of the holes are fitted with a collimator or lens 453 to direct light provided by a fiber optic coupler onto the mirror of an individual actuator-mirror assembly. Each of the lenses 453 acts to collect and collimate the light beams passing through matrix 425. Lens 453 may comprise a gradient index lens, a molded aspherical lens, or some other type of lens known in the art. The embodiment of FIG. 19 may also include an intensity monitoring feedback loop that includes a photodiode to detect a portion of the beam of light, and an optical fiber coupler having a first end connected to an optical fiber and a second end connected to the photodiode.

In the example of FIG. 19, respective input and output optical fibers 454 and 456 are each shown connected to a coupler 455 that is secured to a housing (not shown) by a fiber connector 458. The housing accommodates arrays of input/output fibers for the switch module. Coupler 455 in this example is a 1×2 coupler that passes most of the light signal (e.g., 95%–99%) to the mirror array. A small amount of light (i.e., 1%–5%) is redirected to the photo-detector where it can be amplified and transmitted to a central control center in the main PCBA as part of the signal feedback loop., Fiber lens matrix 425 and actuator-mirror matrix assembly 435 are configured and positioned such that each input/output fiber receptacle of matrix 425 is precisely aligned with a corresponding mirror of assembly 435. Each lens 453, therefore, is associated with a dedicated actuator-mirror assembly 436.

To ease the impact of beam divergence and reduce signal loss of the light beam, the diameter of the collimator lens 453 is chosen dependent upon the overall traveling distance of the light beam switched from input fiber 454 to output fiber 456. A mirror of a first actuator-mirror assembly 436 functions to direct a light beam 460 received from fiber 454 to a reference mirror 440. Reference mirror 440 then reflects light beam 460 to a destination mirror 437 of a second actuator-mirror assembly. Mirror 437 functions to redirect light beam 460 to output fiber 456. Reference mirror 440 and the mirrors of assemblies 436 may be coated with a reflective layer in gold or aluminum to provide high reflectivity (e.g., 98%).

The geometric layout of switch module 430 allows the light beam to travel with minimum distance and with minimum light energy loss. The distance between the fiber-lens matrix 425 and the mirror-actuator assembly 435 as well as the tilting angles for the reference mirror 440 and the mirror-actuator assembly 435 are specified to ensure a uniform and minimized traveling distance for the light beam. For a 1096-port photonic switch, for instance, a typical traveling distance is 1400 mm and the corresponding Raleigh beam diameter (which may expand by 40% over this distance) is about 1.66 mm. Collimator lenses with diameters of 1.8 mm may be chosen in this example to suppress the divergence and reduce the light loss due to the beam divergent issue.

The input and output mirrors of the photonic switch described above are controlled by an intelligent, software-based control system in one implementation. Feed forward and pre-shaping notch filtering may be utilized to eliminate unwanted dynamics of the mechanical structure in the mirror based photonic switch according to one embodiment of the present invention. The input sequence is time optimal in that it is designed to move the mirror from one radial position to another in minimum time. The filter is designed to shape this input sequence in order to prevent the fundamental resonance from vibrating during move and settling periods.

Figure 20:
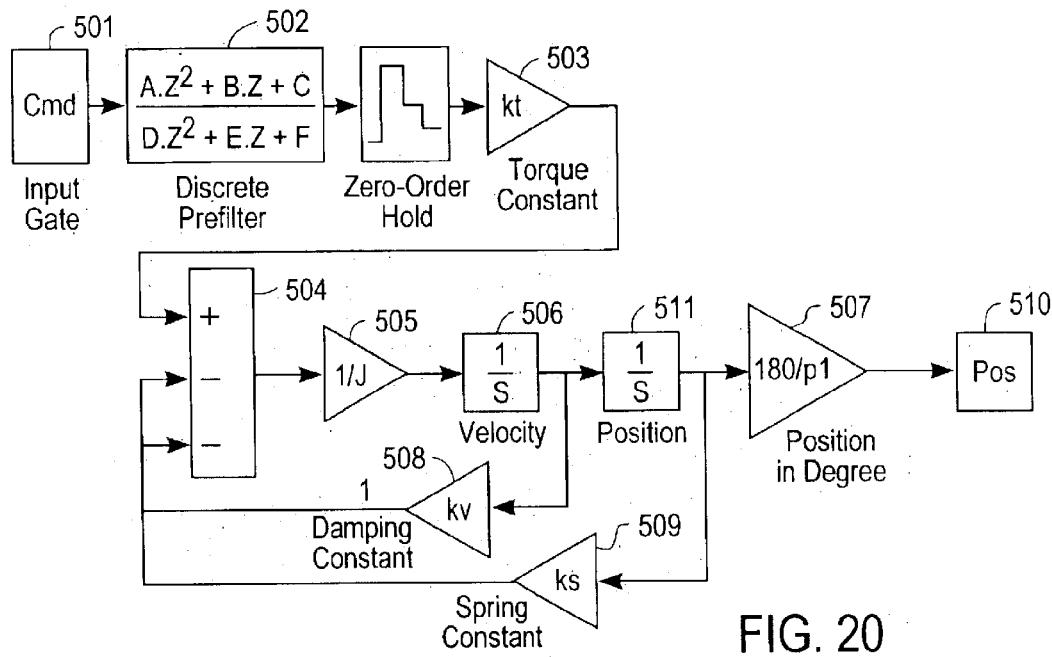
FIG. 20 is a block diagram of an open loop control system for positioning a mirror of a photonic switch in accordance with one embodiment of the present invention.

Referring now to FIG. 20 there is shown a block diagram of an open loop control system to position a mirror of a photonic switch in accordance with one embodiment of the present invention. Using the system shown, the individual mirrors of the actuator-mirror matrix assembly (see FIGS. 1 and 2) are switched between various positions. An input command profile (block 501) produces the trajectory that the mirror has to follow to go from point A to point B, for example. A discrete pre-filter (block 502) is implemented as a biquad band reject filter with a transfer function given as:

$$G(s) = (A \cdot z^2 + B \cdot z + C)/(D \cdot z^2 + E \cdot z + F)$$

Figure 27:
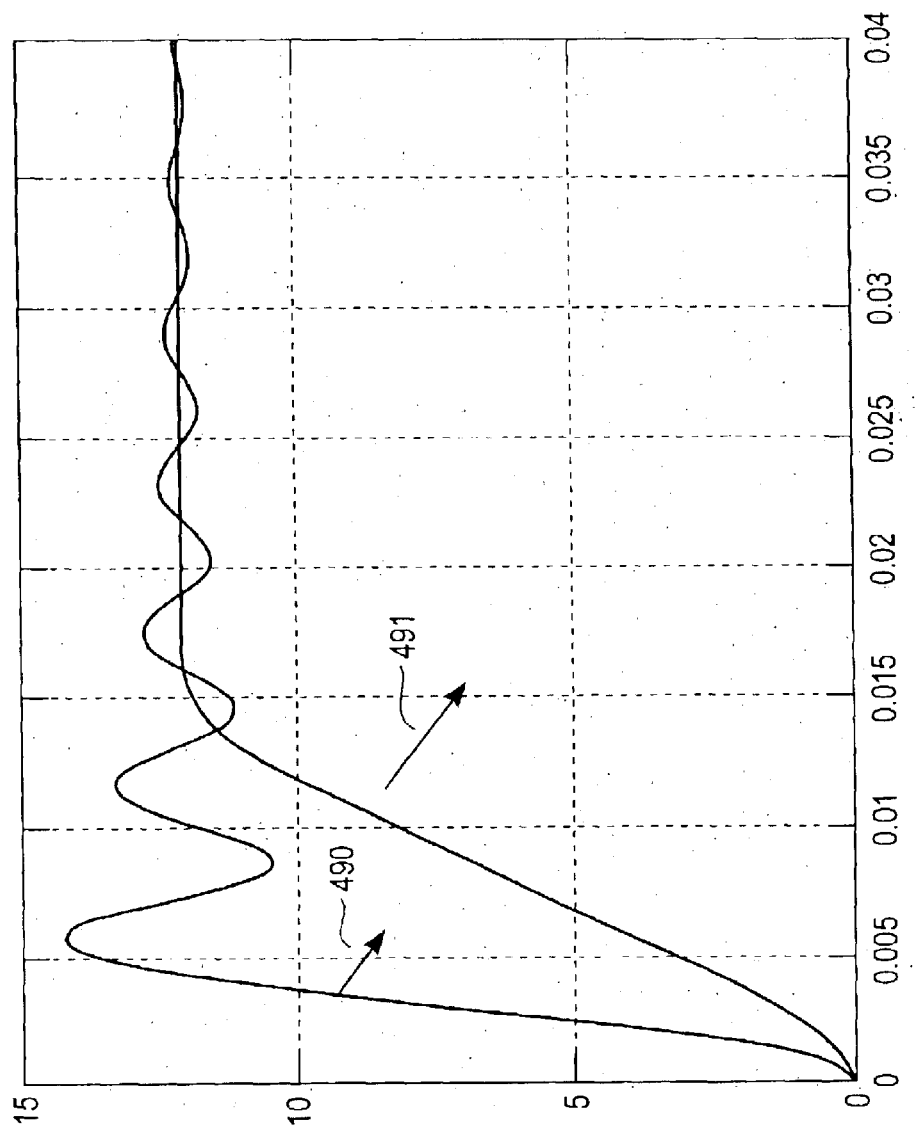
FIG. 27 is a plot that depicts the effect of pre-filter on an input profile signal used to position a mirror in accordance with one embodiment of the present invention.

Pre-filter 502 eliminates unwanted oscillations of the mirrors in the actuator-mirror matrix assembly. FIG. 27 is a plot that depicts the effect of pre-filter on the input profile signal used to position a mirror. Waveform 490 show the command profile without filtering, and waveform 491 is the position response following filtering by block 502.

Continuing with the control system circuit of FIG. 20, torque constant block 503 provides a gain that converts current into torque. The output of block 503 is coupled to the "+" input of summing block 504. The "−" inputs to block 504 are provided from the feedback outputs of blocks 509 and 508, which provide the responses due to the spring constant of the gimbal and the friction of the gimbal, both of which act to oppose the movement of the mirror. For example, block 508 provides a damping gain (kv) that converts velocity into a torque term that is subtracted from the input torque term generated by block 503. Similarly, block 509 provides a damping gain that converts position into a; torque term subtracted from the input torque.

The output of summing block 504 is coupled to inertia conversion block 505, which converts torque into acceleration expressed in radians/(seconds)$^2$. Inertia is converted into velocity (radians/second) by block 511. At block 507 radians are converted into degrees, with the output representing the signal to achieve a desired mirror position in the switching mechanism (shown as block 510).

Figure 21:
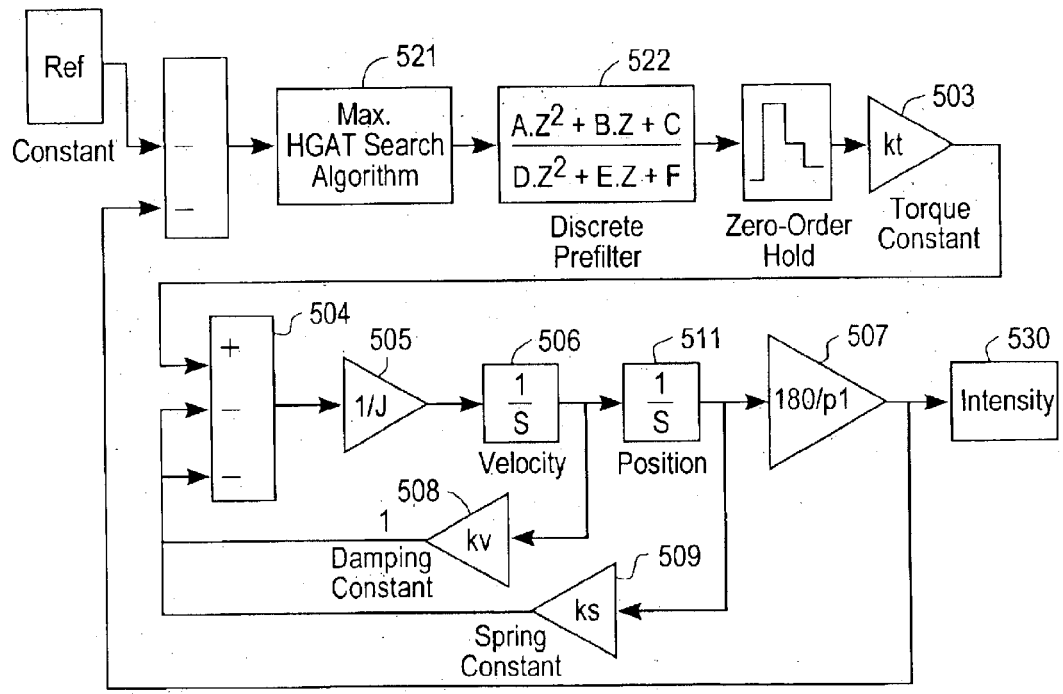
FIG. 21 is a block diagram of an open loop control system for positioning a mirror of a photonic switch in accordance with another embodiment of the present invention.

Referring now to FIG. 21 there is shown a block diagram for open loop control of mirror position for a photonic switch mechanism in accordance with another embodiment of the present invention. Note that in a particular embodiment, a portion (or all) of the component control circuitry may be physically located behind the actuator-mirror assemblies. FIG. 20 shows an open loop block diagram with a discrete pre-filter 502 to remove unwanted mechanical resonances. FIG. 21, on the other hand, shows a feedback mechanism that measures the light intensity and feeds it back to the discrete filter (block 522) using a scanning algorithm of compensation block 521.

The algorithm functions to search and detect maximum light intensity in an all-optical switch having one input port and one output port, each port having two axes. The algorithm is implemented in a digital signal processor (DSP) to control the input and output mirrors so as to pass the maximum amount of light through the switch. In other words, the algorithm finds the optimum coordinate positions for the input and output mirrors where light transmitted through the switch is maximized (i.e., maximum light intensity). The algorithm achieves maximum light throughput in the optical switch utilizing a four-dimensional ("4-D") mathematical calculation. A four dimensional calculation is utilized because the input and output mirrors are each capable of movement in two directions: the x-axis and the y-axis. That is, each mirror has a dedicated mirror actuator assembly that can rotate in both horizontal (x) and vertical (y) directions in order to pass the light to the designated output collimator lens.

Figure 28:
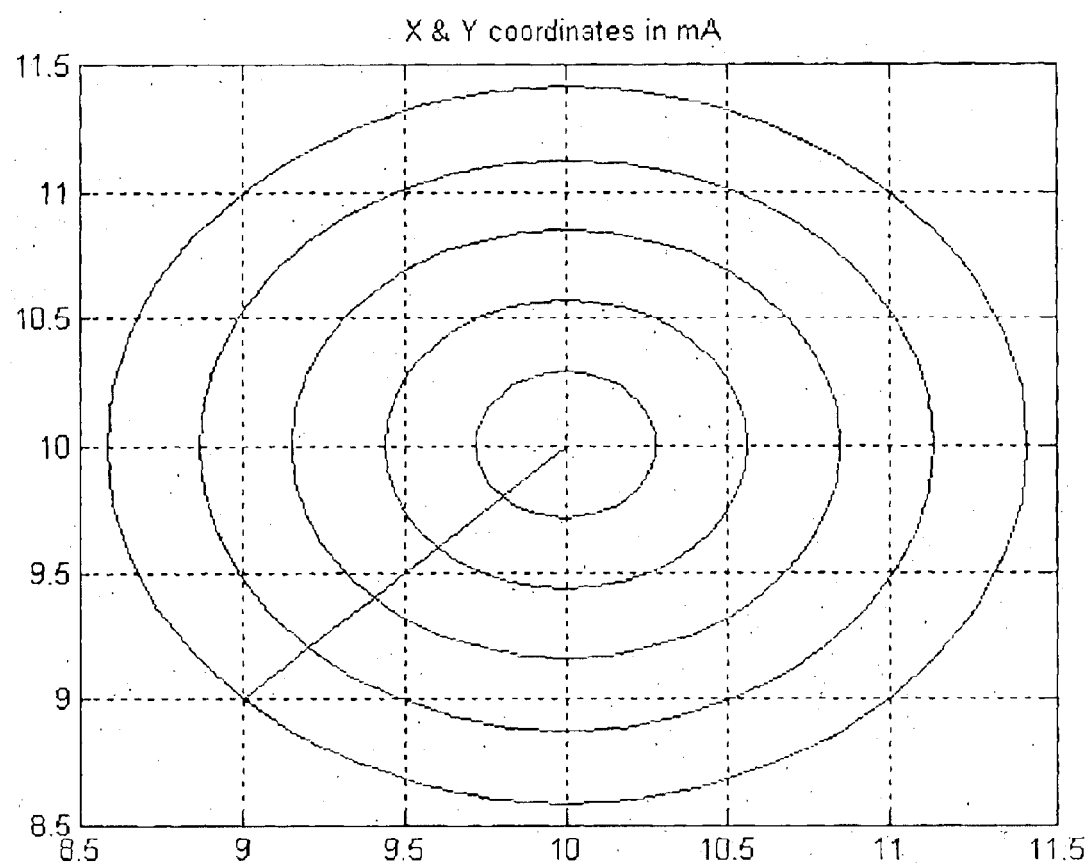
FIG. 28 is a graph illustrating a two-dimensional circular scan for maximum light searching in accordance with one embodiment of the present invention.

FIG. 28 is a graph that illustrates a two-dimensional version of the calibration scan algorithm. The x and y axes of the graph correspond to the x and y directions of pivotal motion of the mirror. Current applied to x and y mirror coils causes deflection in the corresponding axial direction. The algorithm starts with an initial mirror location, or starting origin, and then begins scanning the mirror in a radius about that origin. With each circumferential pass, the radius is decreased slightly. By way of example, in FIG. 28 the initial x, y coordinates are 10 mA, 10 mA of command current. Each circle is divided into fifty segments.

At each segment position the light intensity is measured (by a sensor positioned at the output of the optical switch) and compared to the light intensity reading obtained at the origin. If, at any point during the scan, the light intensity measured at a particular radial location is greater than the intensity measured at the origin, the scan continues with the origin is shifted to the particular radial location. The same process is then repeated for the new origin, but with a slightly smaller starting radius. The algorithm keeps shifting the origin each time a new mirror position produces a greater light intensity. Eventually the mirror converges to a position (i.e., an ending origin) that produces a maximum light intensity value.

Figure 29:
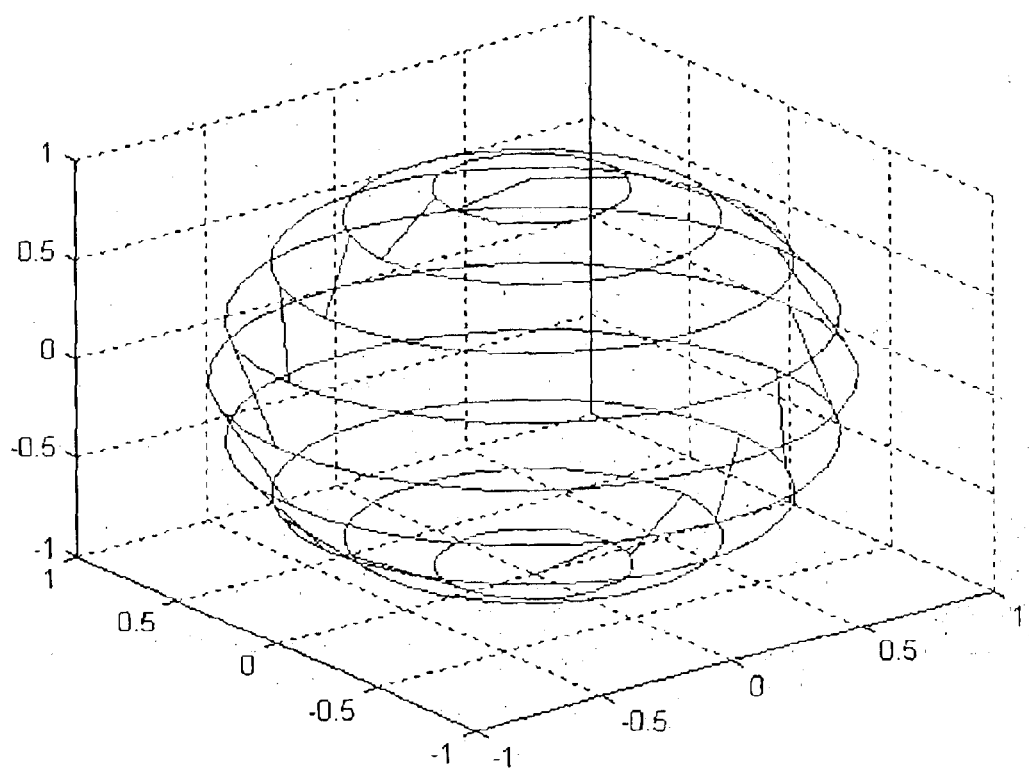
FIG. 29 is a graph illustrating a three-dimensional spherical scan for maximum light searching in accordance with one embodiment of the present invention.

FIG. 29 is a graph that illustrates a three-dimensional version of the calibration algorithm. The three dimensions correspond to the x and y axes of one mirror and one axis of the other mirror. The 3-D version of the algorithm is seen as a sphere with varying radius.

The preferred embodiment of the present invention utilizes an algorithm that generates a 4-D "sphere-like" mathematical structure for the four axes of rotation of the input and output mirrors. During the calibration process the input and output mirrors move simultaneously; hence, the 4-D space. In other words, the algorithm of the present invention moves the x and y axes of both the input and output mirrors at the same time to search for a maximum output light intensity in an all-optical switch. A high-level description language code listing of the mathematical search routine utilized in one embodiment of the invention is provided below.

```
for radius = rstart : radiusdelta : 0            % radius in mA
%       for radius = 0 : -radiusdelta : rstart
        for theta = -pi : pi/ratio : pi
          for phi = - pi : pi/ratio : pi
            for tx4 = - pi : pi/ratio : pi
          x = radius*sin(theta)*cos(phi) + originx;
          y = radius*sin(theta)*sin(phi) + originy;
          z = radius*cos(theta) + origin.z;
          x4 = -((cos(tx4)-sin(tx4))*radius) + originx4
``` where x, y, z, and x4 denote a four-dimensional coordinate position, theta is an angle, originx, originy, originz, and originx4 denote a position of the origin, and radius is a distance (in mA) from the origin. A listing of the complete four-dimensional scanning and maximum light searching algorithm utilized in one embodiment of the invention is provided at the end of the detailed description.

Like the 2-D version described previously, in the 4-D version of the algorithm a portion of the output light intensity is measured at each coordinate position or at specified time intervals. The light intensity measurement is read back into the DSP. If the current reading, is greater than the previous reading, then the current reading is stored as the new maximum and the previous reading is discarded. At the same time, a new search origin is defined based on the coordinates for the input and output mirrors that produced the new maximum light intensity reading.

Figure 30:
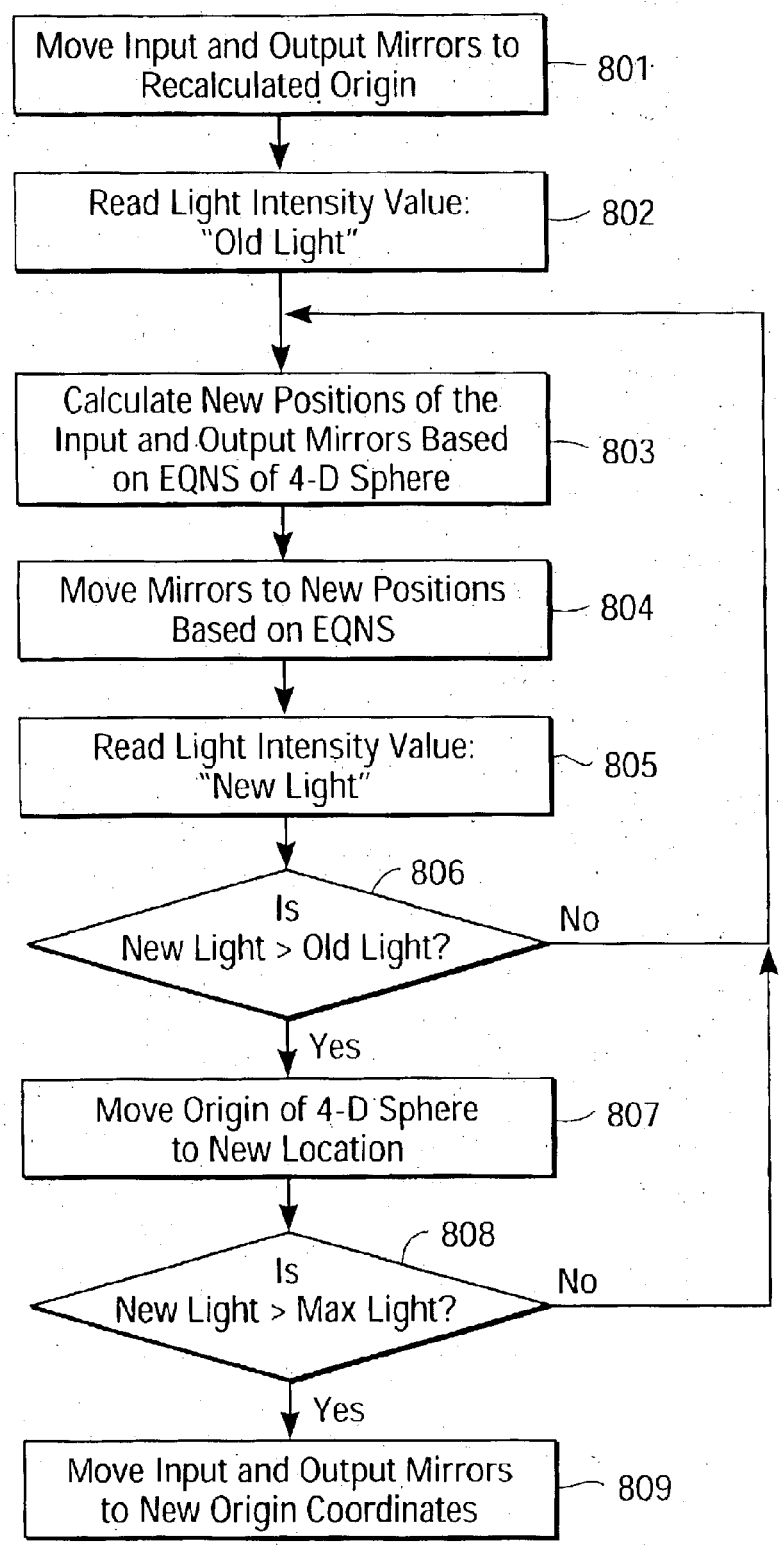
FIG. 30 is a flowchart of a four-dimensional search algorithm utilized in accordance with one embodiment of the present invention.

FIG. 30 is a flowchart showing the operation of one embodiment of the 4-D calibration algorithm of the present invention. The routine begins with block 801 wherein current signals applied to the mirror actuator coils move the input and output mirrors to their predetermined origin positions. The origin positions may simply comprise starting positions of the input and output mirrors. The output light intensity is then read by a photo detector positioned to receive a portion of the light reflected from the output mirror. This reading is stored in the DSP as the initial intensity reading, i.e., "old-light" (block 802).

At block 803, new positions for the input an output mirrors are calculated based on a set of search parameters (i.e., radius, # of steps in each circle, change in radius size, etc.) and the 4-D sphere-like equations. The input and output mirrors are placed in their new locations by applying proportional currents to the mirror actuator coils in block 804.

The output light intensity is read at each position step or at specified time intervals and the measured value is read back into the DSP, i.e., "new-light" (block 805). The new-light value is then compared to the old-light value, as shown by decision block 806. If the current new-light reading is greater than the old-light value, the new-light reading is stored and the old-light reading is discarded. The origin of the 4-D sphere-like equations is shifted to the new location (block 807). In other words, a new search origin is defined based on the coordinates where the new-light reading was obtained. On the other hand, if the new-light reading is less than or equal to the old-light reading, the scan continues at the specified radius and circle step increments. As previously discussed, both the radius and step size may be altered until a new-light value is obtained that exceeds the old-light value.

If a new-light reading is measured that is greater than a maximum value previously recorded (decision block 808) the input and output mirrors are both moved to the x, y coordinates that produced the new maximum light intensity value (block 809). These coordinates are defined as the new origin and the scan and search routine returns to block 803. At this point the search parameters may be altered to define a slightly smaller radius, smaller radius steps, etc. Eventually, as the 4-D origin for the input and output mirrors is repeatedly shifted, the algorithm converges on a location that produces an optimum (i.e., maximum) light intensity reading, at which point the routine ends. This optimum intensity reading may then be converted into an insertion loss specified in dB.

Practitioners in the art will appreciate that the 4-D algorithm described above may be utilized to calibrate an all-optical switch at the factory before the product is shipped. In such a case, the algorithm parameters may be set with a relatively large starting radius to find the light and then find the input and output mirror coordinates that produce the maximum light throughput. This process may be repeated for every port. Alternatively the 4-D algorithm may be executed each time the optical switch is powered-up, or on a periodic basis to insure optimum performance.

During the normal operation of the optical switch the calibrated coordinates may be used to position the input and output mirrors by application of appropriate currents to the mirror actuator coils. At this point, the computer program may enter a tracking mode, where it attempts to maintain the maximum light intensity by continuously monitoring light intensity. It is appreciated, for example, that the position of both the input and output mirrors can drift due to changes in environmental conditions (temperature, vibration, etc.) and power supply voltage. A low radius, 4-D linear search routine may be invoked to correct the positions of the input and output mirrors so as to maintain maximum light throughput. In one embodiment, the tracking algorithm performs a linear scan in which the radius selected depends upon how far away the light intensity reading is from the maximum reading, i.e., the intensity difference between the sensed or monitored light and the maximum reading.

Figure 31:
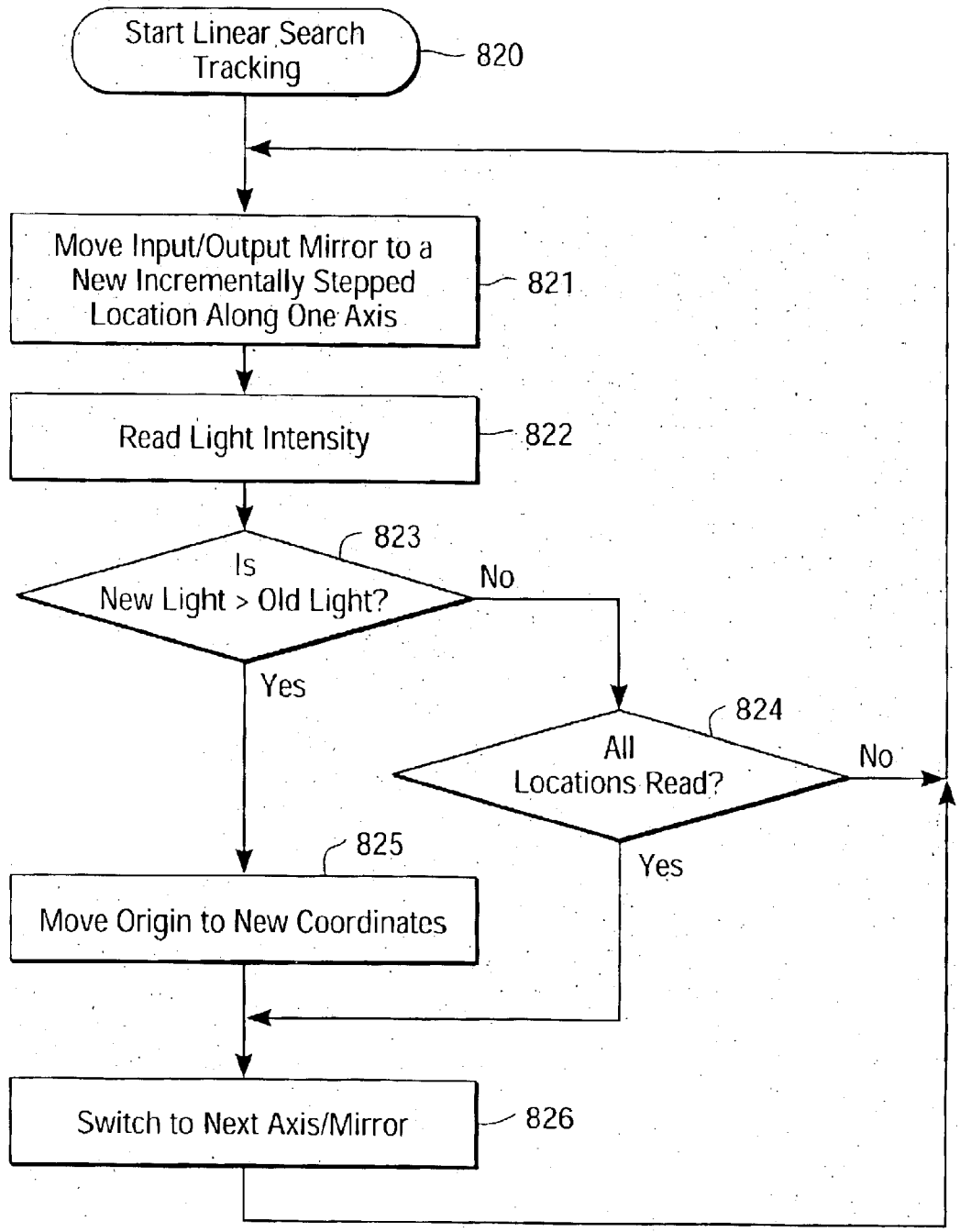
FIG. 31 is a flowchart of a linear tracking algorithm utilized in accordance with one embodiment of the present invention.

FIG. 31 is a flowchart showing the operation of a 4-D linear tracking algorithm according to one embodiment of the present invention. The tracking process starts (block 820) after the mirrors have been moved to their newly calibrated positions arrived at following the execution of the calibration algorithm described above. During the tracking phase, each mirror (input and output) is linearly swept across the x and y axis (block 821) in both the positive and negative directions. In one implementation, the input mirror is incrementally stepped along different locations of the x-axis, followed by incremental steps along the y-axis. At each incremental position, the output light intensity is read (block 822) and compared against the old light intensity value (block 823), which initially is the maximum light intensity value obtained from the calibration routine. If the new light reading exceeds the old reading (block 823), the origin is shifted (825) and the program sequences to the next axis or mirror (block 826) where scanning continues. In other words, the tracking routine continuously looks for a better light intensity value.

In the event that all locations along the first axis (e.g., x-axis) have been read and none of the light intensity values measured is greater than the old-light value (block 824), the tracking routine sequences to the next axis (e.g., y-axis). Once both the x-axis and the y-axis of one mirror (e.g., the input mirror) have been searched, the tracking routine sequences to the next mirror (e.g., the output mirror) and linear scanning along the x and y axes continues as described above.

Broadly speaking, for both the calibration and tracking algorithms the mirrors are iteratively moved to try to locate apposition that produces a better light intensity value. If a particular position produces a better light intensity value, the origin is shifted to the particular position and the scanning process is repeated.

Figure 22:
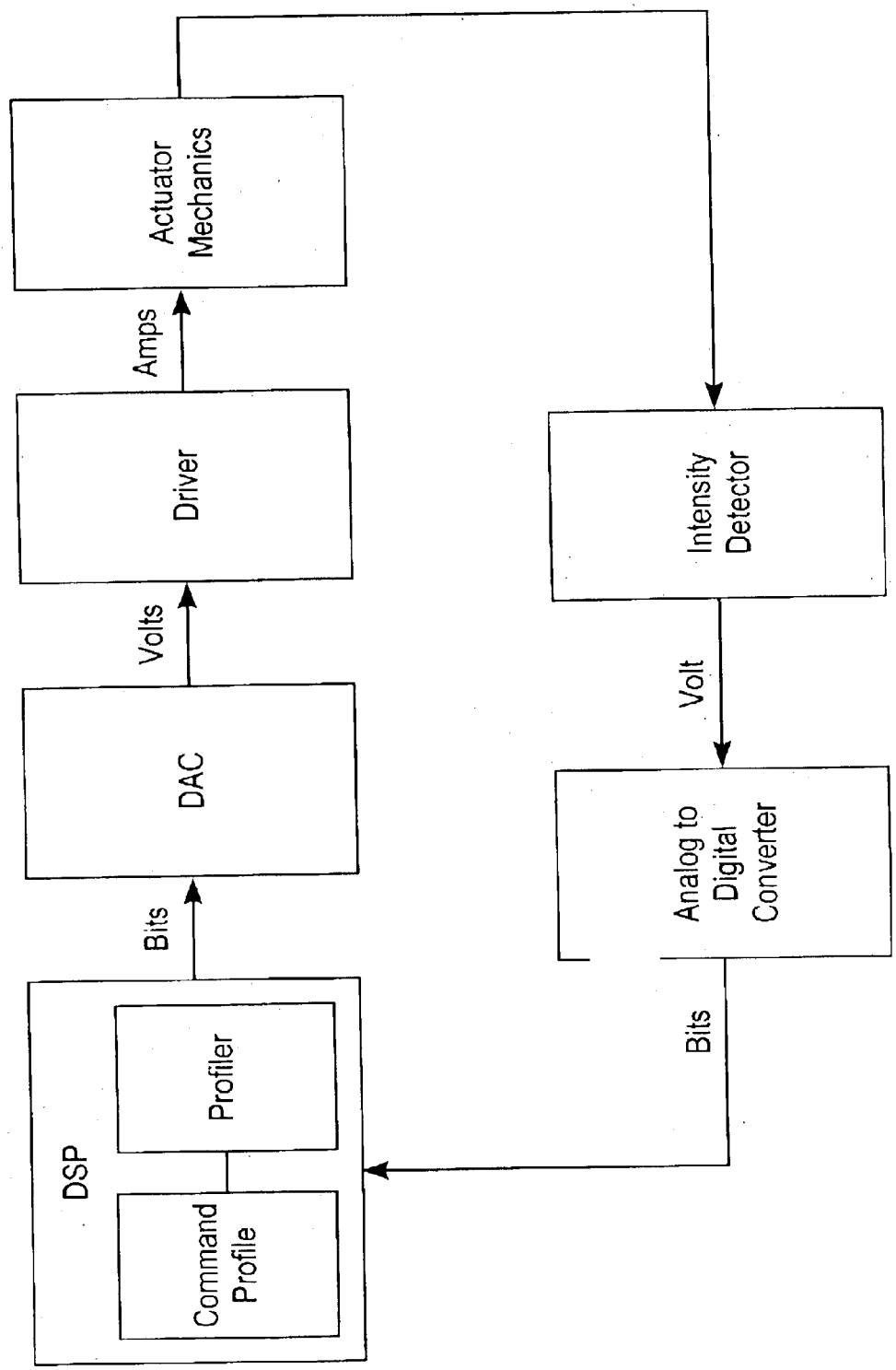
FIG. 22 is a high-level block diagram is an example of an electronics circuit that may be used for control of a photonic switch according to the present invention.

FIG. 22 is a high-level block diagram illustrating one possible implementation of the electronics that may be used for control of a photonic switch according to the present invention. Note that the pre-filter and/or scanning algorithm functions may be realized using a digital signal processor such as the ADSP-2191.

Figure 23:
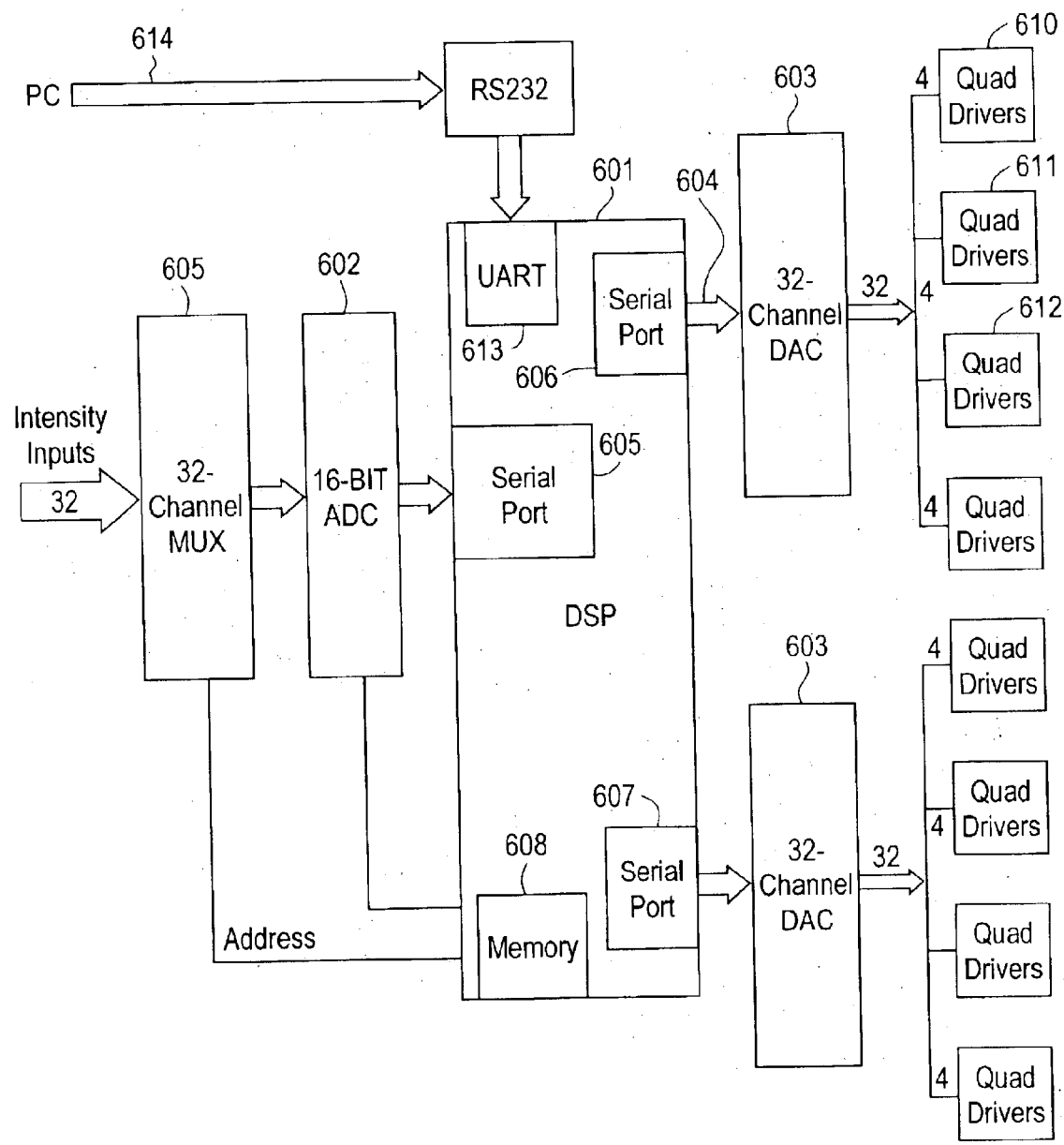
FIG. 23 is a block diagram of the control electronics utilized in a photonic switch according to another embodiment of the present invention.

FIG. 23 is a block diagram of the control electronics utilized in a photonic switch according to one embodiment of the present invention. In the illustrated embodiment, DSP 601 comprises a fixed-point 160 MHz processor with a 6.25 ns instruction cycle. The DSP firmware reads the feedback information from the analog-to-digital converter (ADC) 602, performs compensation, and writes the command into the DAC 603. In addition, DSP 601 has the capability to calibrate the positions of the input and output mirrors in order to minimize the differential optical loss. In this particular implementation, DSP 601 has 3 serial ports each connected to a serial DAC 603. This allows a large number of mirrors (e.g., 48) under control of a single DSP 601.

In operation, the control electronics of FIG. 23, operate for a 16×16 port switch with 32 mirrors. An analog light intensity signal from each of the 32 mirrors is coupled through mutiplexor 605 to ADC 602. ADC 602 converts the analog intensity, signal into a digital 16-bit number that is received by serial port 605 of DSP 601. DSP 601 includes three serial ports 605, 606, and 607, and a memory 608. DSP 601 performs the necessary calculations and sends the appropriate position signal to the mirrors through the 32-channel DAC 603. Quad drivers 610, 611, 612, etc., convert the position signal, into a torque voltage to control the actuator-mirror assemblies. To drive the individual motors, the quad power amplifiers (i.e., the quad drivers 610, 611, 612, etc.) are used delivering 250 mA each.

DSP 601 also combines 64$k$ words of SRAM configured as 32$k$ words of data memory, 32$k$ words of program memory, and access of up to 16M words of external memory. DSP 601 also includes a UART 613 for personal computer communications via bus 614; general purpose programmable flag pins; and an eight or 16-bit host port interface.

Figure 24:
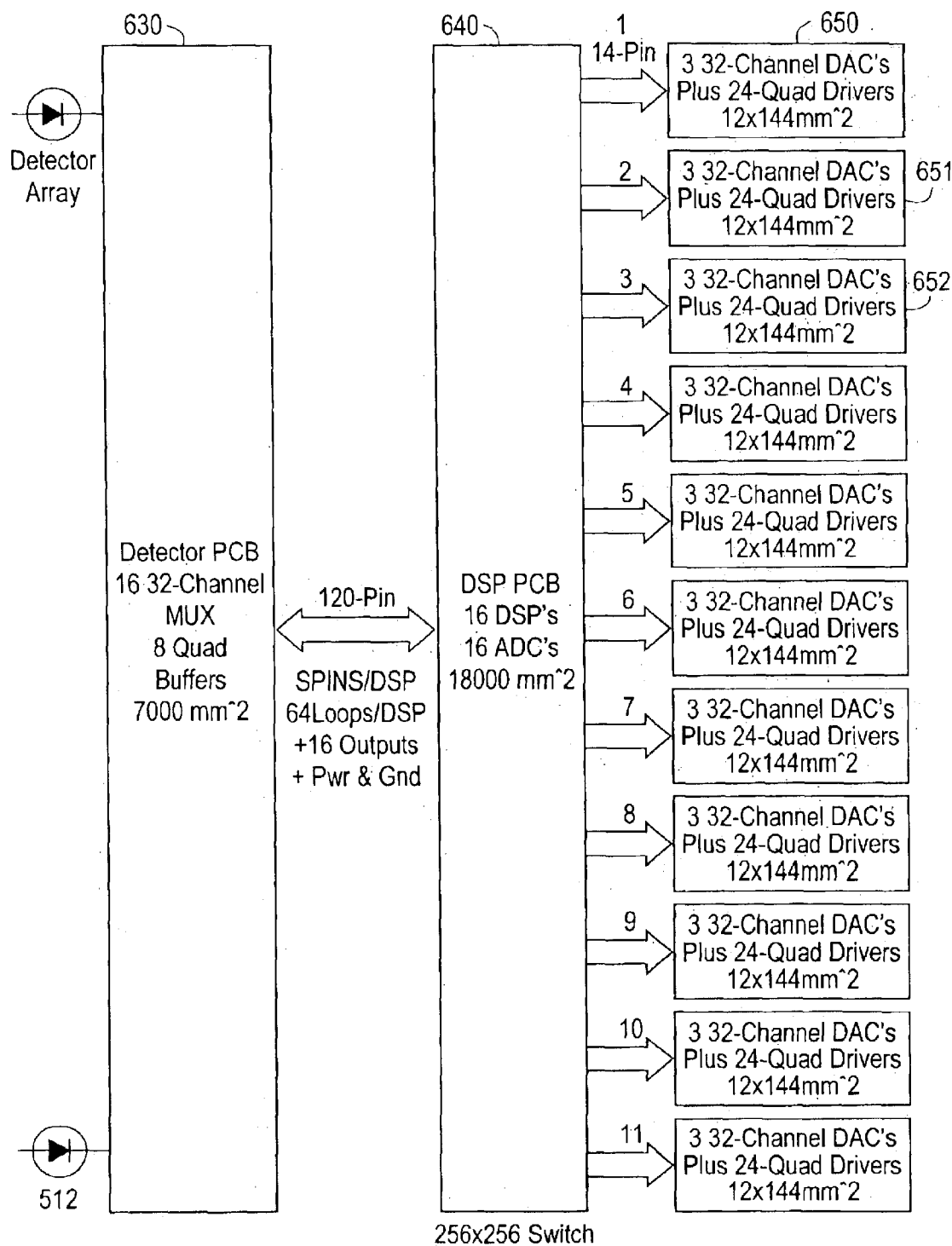
FIG. 24 is a functional circuit diagram for a 256×256 switch fabric according to one embodiment of the present invention.

FIG. 24 shows a 256×256 switch fabric in accordance with another embodiment of the present invention. To minimize the number of interconnect wires the electronics may be divided in to 3 PCB's 630, 640, and 650. The main PCB 640 includes the DSPs and ADCs. The detector PCB 630 carries the photo detector, muxes and buffer amplifiers. The DAC/driver PCB's 650, 651, 652, etc., hold DACs and drivers and are integrated with the mirror bars.

Figure 25:
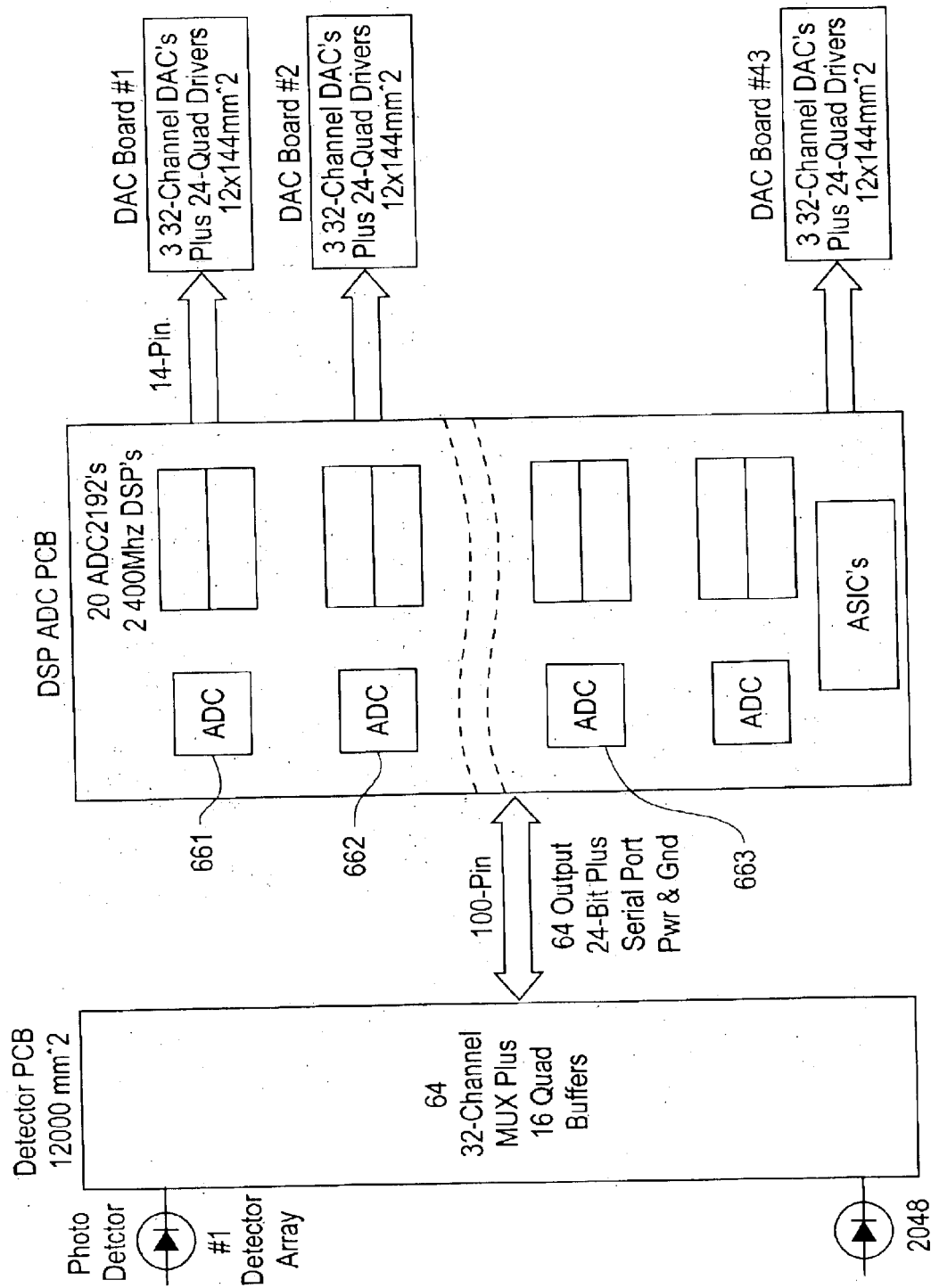
FIG. 25 shows the hardware configuration for a 1024× 1024 switch fabric according to one embodiment of the present invention.

FIG. 25 shows the hardware configuration for a 1024× 1024 switch fabric in accordance with one embodiment of the present invention. The electronics for the 1024×1024 are the same as the electronics illustrated in FIGS. 23 and 24, there are simply a greater number of each component (e.g., more ADCs 660, 661, 662, etc.).

Figure 26:
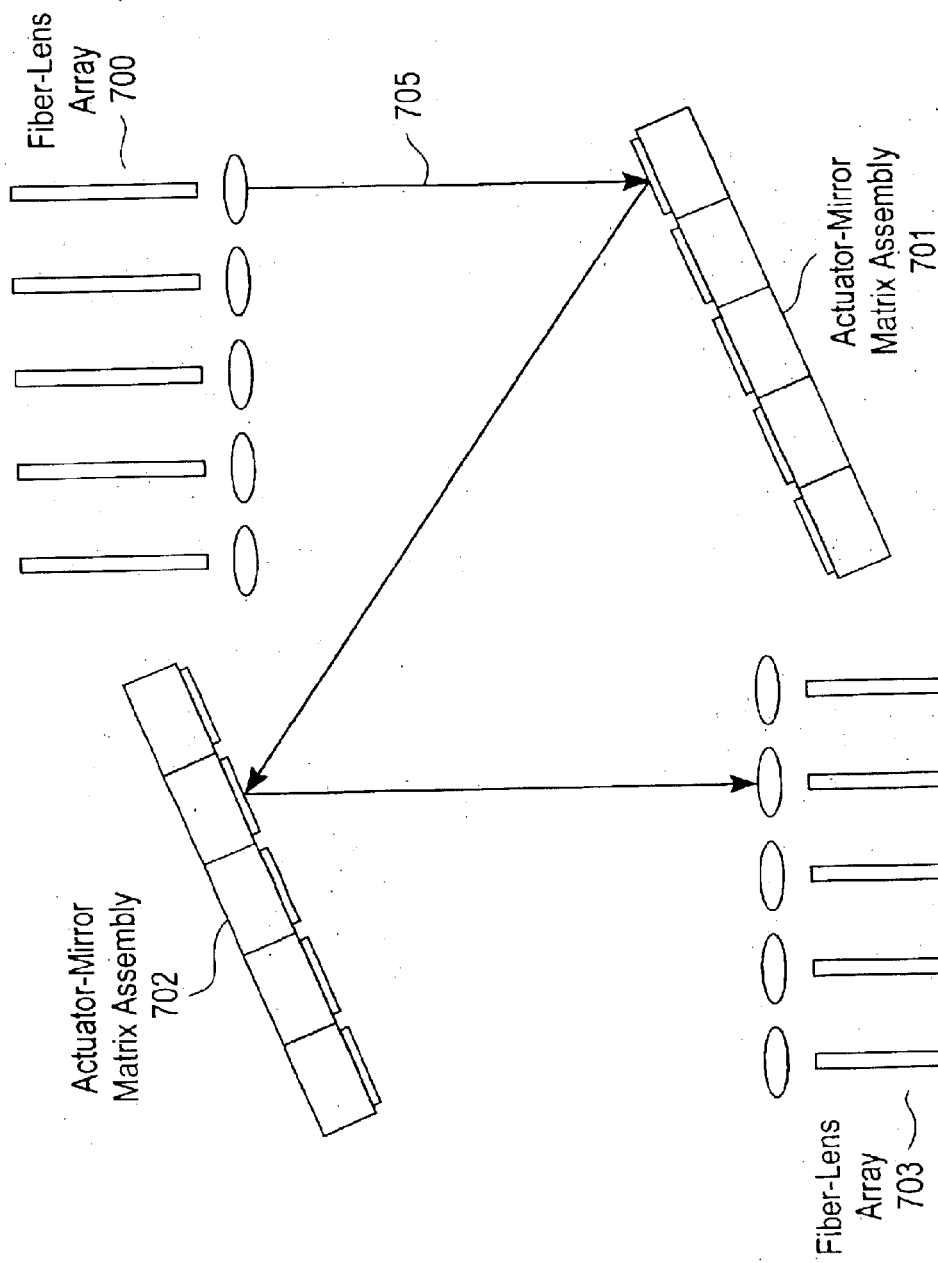
FIG. 26 illustrates an example of a folded large-matrix photonic switch layout in accordance with one embodiment of the present invention.

FIG. 26 shows an example of a folded, matrix switch according to another embodiment of the present invention. An input fiber-lens array 700 is shown directing a light beam 705 to a first actuator-mirror matrix assembly 701, which directs beam 705 to a second actuator-mirror matrix assembly 702. Assembly 702 redirects light beam 702 to one of the fibers of output fiber-lens array 703.

The following is a high-level description language code listing of the four-dimensional scanning and maximum light searching algorithm utilized in one embodiment of the invention:

```
% Target4d.m is a Matlab file for a 4 dimensional scanning and maximum light searching
% algorithm.
% Mansur Kiadeh © Lightbay Networks, Corp. 2001–2003 (17 U.S.C. § 401)
echo off
%clear all;
%.....................................................    load parameters............................................
%symbolgen;                           % load all dsp symbols
t00=clock;                            % time the search
igain=13.17e-3;                       % power driver conversion
rstart=.06;                           % sphere radius in ma
radiusdelta=-.01;                     % -.01; % radius delta in ma *1.4
ratio=-rstart/radiusdelta;            % to be used to divide the circle by
ratio=4;
rangex4=.2;                           % range of the linear scan in mA.
stpx4=-.01;                           % step of linear scan in mA
pass.old=-1;                          % initialize
pass.x=0;
pass.y=0;
pass.z=0;
adch=1;                               % ADC channel
vmax=3.5;                             % max. light reading in volts before conversion
to mW.
maxlight=0;
rad=0;                                % radius for display
scount=1;                             % count for spherical scan
1count=1;                             % count for linear scan
maxcount=1;
outputx= [];
outputy= [];
```

-continued

```
maxlight= [];
cntmax= [];
%..........................................  input channel numbers and initial coordinates..........
%chxiyz=input ('enter Xi, Yi, Xo & Yo Chanells.. ');
chxiyz=chn12;
chxi=chxiyz (1,1);
chxo=chxiyz (1,2);
chyi=chxiyz (1,3);
chyo=chxiyz (1,4);
%originxyz=input ('enter Xi, Yi, Xo & Yo start current in ma.. ');
originxyz=xy12;
origin.x=originxyz (1,1);
origin.y=originxyz (1,2);
origin.z=originxyz (1,3);
origin.x4=originxyz (1,4);
%
writedm(symbol.a_DAC_Channels_Move_To.address+chxi,igain*(origin.x));
% initial value to dac #ch
%writedm(symbol.a_DAC_Channels_Move_To. address+chxi,igain*(origin.x));
% initial value to dac #ch
writedm(symbol.a_DAC_Channels_Move_To.address+chxo,igain*(origin.y));
% initial value to dac #ch
%writedm(symbol.a_DAC_Channels_Move_To. address+chxo,igain*(origin.y));
% initial value to dac #ch
writedm(symbol.a_DAC_Channels_Move_To.address+chyi,igain*(origin.z));
%
writedm(symbol.a_DAC_Channels_Move_To.address+chyo,igain*(origin.x4));
%
%   read light 3 times and average
pass.old=2.5* (readdm(symbol.a_ADC_Channels.address+adch) +1);
% adc in volts
%
adcx=pass.old;
disp(' ')
disp(' ')
disp (['first adc reading in micro watts: ',num2str(adcx)])
%..........................................  start of the spherical scan & search..........................
for radius=rstart:radiusdelta:0       % in mA.
%    for radius=0:-radiusdelta:rstart
     for theta=-pi:pi/ratio:pi
         for phi=-pi:pi/ratio:pi
             for tx4=-pi:pi/ratio:pi
         x=radius*sin(theta)*cos(phi) +origin.x;
         y=radius*sin(theta)*sin(phi) +origin.y;
         z=radius*cos(theta)+origin.z;
         x4=-((cos(tx4)-sin(tx4))*radius)+origin.x4;
         writedm(symbol.a_DAC_Channels_Move_To.address+chxi,igain*(x));
% initial value to dac #ch
%
         writedm(symbol.a_DAC_Channels_Move_To.address+chxo,igain*(y));
% initial value to dac #ch
         writedm(symbol.a_DAC_Channels_Move_To.address+chyi,igain*(z)); %
         %
         writedm(symbol.a_DAC_Channels_Move_To.address+chyo,igain*(x4));
             pass.new=2.5*(readdm(symbol.a_ADC_Channels.address+adch)+1);
    % adc in volts
             adcx=pass.new
             icc=1
                 if ( pass.new > pass.old + .005)
                     pass.x=x
                     pass.y=y
                     pass.z=z
                     pass.x4=x4
                     pass.old=pass.new;
                     newlight=pass.new;
                     maxlight (:,maxcount) =newlight;
                     cntmax (maxcount) =maxcount;
                     maxcount=maxcount+1;
                     origin.x=pass.x
                     origin.y=pass.y
                     origin.z=pass.z
                     origin.x4=pass.x4
                     rad=radius*1.4
                 end
             outputx (:,scount) =x;
             outputy (:,scount) =y;
             outputz (:,scount) =z;
```

```
        outputx4 (:,scount) =x4;
        scount=scount+1;
                if adcx > 3.95 break, end %
        end
                if adcx > 3.95 break, end
        end
                if adcx > 3.95 break, end
        end
                if adcx > 3.95 break, end
        end
        % update all 4 coils of the switch
xi12=x;
yi12=y;
xo12=z;
yo12=x4;
sw12n
```

We claim:

1. A method for maximizing light transmission through an optical switch which includes a first mirror to direct a beam of light received from an input optical port to a second mirror that redirects the beam of light to an output optical port, the first and second mirrors each being pivotally actuated on first and second axes, the method comprising:

(a) simultaneously moving the input and output mirrors through a sequence of coordinate positions about an origin;

(b) reading a light intensity value transmitted to the output optical port at each coordinate position;

(c) comparing the light intensity value read at each coordinate position with a previous light intensity value, if a particular coordinate position produces a light intensity value greater than the previous light intensity value, then (d) shifting the origin to the particular coordinate position.

2. The method of claim 1 wherein the previous light intensity value is read at the origin.

3. The method according to claim 2 further comprising:

(e) repeating (a)–(d).

4. The method of claim 3 wherein a maximum light intensity is found when none of the light intensity values produced at the coordinate positions in the sequence is greater than the previous light intensity value read at the shifted origin.

5. The method of claim 1 wherein the sequence is calculated in accordance with a set of mathematical equations.

6. The method of claim 5 wherein the set of mathematical equations comprises:

$$x = radius * sin(theta) * cos(phi) + originx;$$

$$y = radius * sin(theta) * sin(phi) + originy;$$

$$z = radius * cos(theta) + originz;$$

$$x4 = -((cos(tx4) - sin(tx4)) * radius) + originx4$$

where x, y, z, and x4 denote a four-dimensional coordinate position, theta is an angle, originx, originy, originz, and originx4 denote a position of the origin, and radius is a distance from the origin.

7. The method of claim 6 wherein the distance from the origin corresponds to a current applied to actuators that pivot the input and output mirrors.

8. A method for maximizing light transmission through an optical switch which includes first and second mirrors, each mirror being pivotally actuated on first and second axes, the method comprising:

(a) moving the input and output mirrors to a predetermined origin;

(b) reading a first light intensity value at an output port of the optical switch with the input and output mirrors at the predetermined origin;

(c) calculating new coordinate positions for the input and output mirrors based on a set of mathematical equations;

(d) simultaneously moving the input and output mirrors to the new coordinate positions;

(e) reading a current light intensity value at an output port of the optical switch with the input and output mirrors at the new coordinate positions;

(f) comparing the current light intensity value against the first light intensity value, if the current light intensity value is greater than the first light intensity value, then (g) shifting the predetermined origin to the new coordinate positions.

9. The method of claim 8 further comprising:

(h) storing the current light intensity value as the first light intensity value for the shifted origin; and (i) repeating (c)–(h).

10. The method of claim 8 further comprising repeating (c)–(g) when the current light intensity value is less than or equal to the first light intensity value.

11. The method of claim 8 wherein the set of mathematical equations comprises:

$$x = radius * sin(theta) * cos(phi) + originx;$$

$$y = radius * sin(theta) * sin(phi) + originy;$$

$$z = radius * cos(theta) + originz;$$

$$x4 = -((cos(tx4) - sin(tx4)) * radius) + originx4$$

where x, y, z, and x4 denote a four-dimensional coordinate position, theta is an angle, originx, originy, originz, and originx4 denote a position of the predetermined origin, and radius is a distance from the predetermined origin.

12. A computer program product comprising:

a computer useable medium and computer readable code embodied on the computer useable medium for causing actuation of input and output mirrors of an optical switch so as to maximize light transmission through the optical switch, execution of the computer readable code causing:

simultaneous movement of the input and output mirrors through a sequence of coordinate positions about an origin, the input and output mirrors pivotally moving on first and second axes;

a light intensity value to be read at an output optical port for each coordinate position;

comparison of the light intensity value read at each coordinate position with a previous light intensity value, if a particular coordinate position produces a light intensity value greater than the previous light intensity value, then the computer readable code causing the origin to be shifted to the particular coordinate position.

13. The computer program product of claim 12 wherein the previous light intensity value is read at the origin.

14. The computer program product of claim 12 wherein the sequence is calculated in accordance with a set of mathematical equations.

15. The computer program product of claim 12 wherein the set of mathematical equations comprises:

$$x = radius * \sin(theta) * \cos(phi) + originx;$$

$$y = radius * \sin(theta) * \sin(phi) + originy;$$

$$z = radius * \cos(theta) + originz;$$

$$x4 = -((\cos(tx4) - \sin(tx4)) * radius) + originx4$$

where x, y, z, and x4 denote a four-dimensional coordinate position, theta is an angle, originx, originy, originz, and originx4 denote a position of the origin, and radius is a distance from the origin.

16. A method of maintaining maximum light transmission through an optical switch which includes first and second mirrors, each mirror being pivotally actuated on first and second axes, the method comprising:

(a) incrementally stepping the first mirror through a series of coordinate positions along the first axis;

(b) reading a light intensity value transmitted to an output optical port at each coordinate position;

(c) comparing the light intensity value read at each coordinate position with a previous light intensity value, if a particular coordinate position produces a light intensity value greater than the previous light intensity value, then (d) shifting the origin to the particular coordinate position.

17. The method of claim 16 further comprising: repeating (a)–(d) for the first mirror along the second axis.

18. The method of claim 16 further comprising: repeating (a)–(d) for the second mirror.

19. The method of claim 16 further comprising: repeating (a)–(d) for the second mirror along the second axis.

20. A method of maintaining maximum light transmission through an optical switch which includes first and second mirrors, each mirror being pivotally actuated on first and second linear axes, the method comprising:

(a) continually measuring a light intensity value at an output optical port of the optical switch;

(b) moving the first mirror along the first linear axis, and then along the second linear axis;

(c) moving the second mirror along the first linear axis, and then along the second linear axis;

(d) shifting an origin of the first and second mirrors whenever the light intensity value measured at a particular coordinate position is greater than a current maximum light intensity value, the origin being shifted to the particular coordinate position.

21. The method of claim 20 further comprising:

(e) storing the light intensity measured at the particular coordinate position as the current maximum light intensity value;

(f) repeating (a)–(e).

* * * * *